US 7,082,456 B2

(12) United States Patent
Mani-Meitav et al.

(10) Patent No.: US 7,082,456 B2
(45) Date of Patent: Jul. 25, 2006

(54) ACCELERATING RESPONSES TO REQUESTS MADE BY USERS TO AN INTERNET

(75) Inventors: Irit Mani-Meitav, Atlit (IL); Assaf Sarfati, Tiv'on (IL)

(73) Assignee: FilesX Ltd., Haifa (IL)

( * ) Notice: Subject to any disclaimer, the term of this patent is extended or adjusted under 35 U.S.C. 154(b) by 675 days.

(21) Appl. No.: 10/221,882

(22) PCT Filed: Mar. 4, 2001

(86) PCT No.: PCT/IL01/00203

§ 371 (c)(1),
(2), (4) Date: Sep. 16, 2002

(87) PCT Pub. No.: WO01/69439

PCT Pub. Date: Sep. 20, 2001

(65) Prior Publication Data

US 2003/0050974 A1    Mar. 13, 2003

(51) Int. Cl.
*G06F 15/16* (2006.01)

(52) U.S. Cl. ................. 709/203; 709/217; 709/219
(58) Field of Classification Search ................. 709/203
See application file for complete search history.

(56) References Cited

U.S. PATENT DOCUMENTS

| 5,918,013 | A |   | 6/1999  | Mighdoll et al. |         |
|-----------|---|---|---------|-----------------|---------|
| 6,128,668 | A |   | 10/2000 | Barber et al.   |         |
| 6,144,996 | A |   | 11/2000 | Starnes et al.  |         |
| 6,157,925 | A |   | 12/2000 | Jenkins et al.  |         |
| 6,173,333 | B1| * | 1/2001  | Jolitz et al.   | 709/240 |
| 6,510,469 | B1| * | 1/2003  | Starnes et al.  | 709/247 |
| 6,591,288 | B1| * | 7/2003  | Edwards et al.  | 709/203 |
| 2004/0044731 | A1 | * | 3/2004 | Chen et al.    | 709/203 |

OTHER PUBLICATIONS

Douglas E. Comer, Internetworking With TCP/IP, vol. 1: Principles, Protocols, and Architecture, 3$^{rd}$ Edition, Prenctice Hall, 1995.

* cited by examiner

*Primary Examiner*—Zarni Maung
*Assistant Examiner*—Glenford Madamba
(74) *Attorney, Agent, or Firm*—Frishauf, Holtz, Goodman & Chick, P.C.

(57) ABSTRACT

Method and system are disclosed for accelerating a response to a request made by a user of an Internet (1) coupled to a server (2), which is coupled to a shared storage (5). Preferably, an object response accelerator (4), or ORA, is inserted between the Internet and the server, and the ORA is coupled by at least one direct access communication link (DACL) to the shared storage.

A request from a user to the server is forwarded to the ORA for detection of a condition, on the request. The request is processed locally by the ORA in presence of the condition, but returned to the server in absence thereof. Local processing calls for the ORA to access the shared storage via the DACL and to retrieve the response therefrom. A response to the user is returned via the ORA, both when processed locally or by the server.

51 Claims, 9 Drawing Sheets

US 7,082,456 B2

ACCELERATING RESPONSES TO REQUESTS MADE BY USERS TO AN INTERNET

This application is a U.S. National Phase Application Under 35 USC 371 of International Application PCT/IL 01/00203 (published in English) filed Mar. 4, 2001.

TECHNICAL FIELD

The invention relates to the acceleration of data transfer in a server-based computing network and in particular, to the acceleration of responses to requests made by users to an Internet.

BACKGROUND ART

The definition of "internet" and of "internetworking" is accepted as defined in the book by Douglas E. Corner named "Internetworking with TCP/IP (Transmission Control/Internet Protocol)", volume I, third edition, 1995, ISBN-0-13-216987-8 the entire disclosure of which is incorporated herewith by reference. "In the past 15 years, a new technology has evolved that makes it possible to interconnect many disparate physical networks and make them function as a coordinated unit. The technology called internetworking accommodates multiple, diverse underlying hardware technologies by providing a way to interconnect heterogeneous networks and a set of communication conventions. The internet technology hides the details of network hardware and permits computers to communicate independent of their physical network connections." (p.1).

Corner views an Internet from the point of view of the user, wanting to "view an internet as a single, virtual network to which all machines are attached despite their physical connections." (p.55). Furthermore, Corner maintains that TCP/IP makes all networks equal. "The TCP/IP internet protocol treats all networks equally. A local area network like an Ethernet, a wide area network like the ANSET backbone, or a point-to-point link between two machines each count as one network."

Such a computer network is illustrated schematically in FIG. 1, showing a plurality of users 1, all of them connected to an Internet 2. FIG. 1 is drawn along the lines of FIG. 3.3 by Corner but simplified. A plurality of servers 3 is also coupled to the Internet 2. Servers 3, also called internet-servers, server computers or server platforms, may operate on the same Internet, but as many vendors produce numerous makes and models, the servers usually operate under the control of different Operating Systems. The links L1 and L2 connect, respectively, between the users 1 and the Internet 2 as well as between the Internet 2 and the servers 3.

Evidently, the Internet depicted in FIG. 1 includes private Internets, or corporate Internets, as well as the public Internet. Requests emitted by the users 1 of the Internet 2 to the servers 3 may include, among others, Internet-compatible universal resource locators (URLs) identifying sources of the desired information.

FIG. 1 also represents the Internet, which consists of a group of users 1, or clients 1, and servers 2, linked together in a computer network. The structure of the Internet is configured as an aggregation of networks connected by gateways. For our purpose, the Internet is considered to represent a Local Area Network (LAN) with accesses to other LANs via Gateways.

FIG. 2 features a Shared Storage 5, coupled by links L3 to the servers 3. The same numerals are used in the various drawings to indicate similar elements. The links L3 may be either identical or different from the links L1 and L2. Using Shared Storage lowers storage costs and makes resource management easier.

Since the return to server-based computing, information is stored on servers, which are accessed via standard browsers. However, as traffic on the Internet is doubling every 100 days, the network and the server resources constantly require additional capability to keep up with the ever-increasing customer demands. Remedies to the increasing response time, due to the higher load imposed on the servers, include: replacement of servers with computers that are more powerful and addition of servers. Also implemented are: balancing locally or remotely balancing of the workload among duplicated servers (by Load Balancing or Internet Traffic Management, ITM), use of Cache Technology (Proxy Servers, Server Caches or Cache Appliances) and introduction of added storage.

For example, to avoid a long wait, U.S. Pat. No. 6,128,701 disclosed by Malcolm et al., proposes a system for automatically and optimally refreshing documents in a cache, for all documents to be ready and permit a fast response to a potential request by a user. Malcolm proposes a statistical method to implement his invention. It is assumed that the necessary computing resources are available for constantly refreshing all documents, disregarding the heavy investment required for the necessary computer hardware. One must consider that the solution devised by Malcolm appends an additional computer dedicated to the handle caching and further assumed that a request for a document from the server is performed at low frequency.

As another example of the quest for increased speed, U.S. Pat. No. 6,091,725, to Cheriton et al., teaches a method for Internet traffic management, traffic prioritization, access control, and packet forwarding in a computer network. There are specified processing steps for each flow including traffic management, flow control, packet forwarding, access control, and other network management functions. However, the method of Cheriton at al. requires a duplication of servers, their applications and their Internet sites. This solution is expensive and calls for the duplication of hardware, software and system administration effort.

It is thus obvious that there is a need to accelerate the speed of responses to user requests and in particular, to accelerate retrieval of information stored on servers, thus of responses saved in storage.

SUMMARY OF THE INVENTION

It is an object of the present invention to provide a method for accelerating a response to a user request received from a user coupled by an Internet to a server, the server being coupled to a data storage facility for returning the response fetched therefrom to the user. The acceleration method including the steps of coupling an object response accelerator (ORA) to the Internet, coupling a direct access communication link from the ORA to the data storage facility, and bypassing the server through the direct access communication link for accelerated access to the data storage facility and for accelerated return of the response to the user. Thereby the ORA relieves processing load from the server. The method further operates a mechanism on the user request for detecting a capacity for retrieval of the response from the data storage facility through the direct access communication link. The method also including the steps of retrieving the response for return to the user from the data storage facility through the direct access communication link, when the capacity is detected, and of retrieving the response for return to the user from the server, upon failure to detect the capacity.

It is another object of the present invention to provide a method for accelerating responses to requests made by users coupled to an Internet environment, the Internet environment including a server and a shared storage, the server being coupled to the Internet and to the shared storage. The method including the steps of inserting an object response accelerator (ORA) in the Internet environment between the Internet and the server, the ORA being coupled to the Internet, to the server and to the shared storage. The ORA receiving each request from each user for the purpose of making a response-routing decision and then, routing the request according to the decision, the response-routing decision including analyzing the request to determine whether the response to the request pertains to a first case or to a second case. The first case indicating that the response may be obtained via the ORA and directly from the shared storage and the second case indicating that the request must be processed by the server. The response-routing including in the first case, routing the request from the ORA for retrieval of the response from the shared storage, retrieving the response and returning the response from the shared storage through the ORA and through the Internet to the user. In the second case, routing the request from the ORA to the server, for the response to be processed by the server, and forwarding the processed response from the server via the ORA and via the Internet to the user.

It is also an object of the present invention to provide an acceleration method for accelerating return of a response object to a user request received from a user coupled by an Internet to a server, and the server being coupled to a data storage facility from where the response object is returned to the user from the server. The acceleration method including the steps of coupling an ORA to the Internet and to the server, adding a direct access communication link between the ORA and the data storage facility and receiving the user request in the ORA. Also included are detecting presence, on the user request, of at least one condition for retrieval of the response object from the data storage facility through the direct access communication link and bypassing the server through the direct access communication link in presence of the at least one condition. Thereby, accelerating access to the data storage facility and accelerating return of the response object retrieved therefrom. Furthermore, forwarding the user request to the server, for the server to return the response object to the user in absence of the at least one condition.

It is a further object of the present invention to provide an acceleration method including establishing an ORA bypass for linking of the Internet directly to the server, and operating a software-sensor for detecting normal operation of the ORA. The software-sensor commands bypass of the ORA through the ORA bypass upon detection of absence of normal operation of the ORA.

It is an additional object of the present invention to provide an acceleration method including detecting adequacy of type of the user request, and detecting representation of the response object in the ORA.

It is an additional object of the present invention to provide an acceleration method wherein the ORA includes a Network Communication Subsystem (NECS) coupled to the Internet, the NECS for receiving user requests and for returning responses to the user(s). Also included is a Server Communication Subsystem (SCS) coupled to the server and to the NECS, the SCS for transmitting user requests to and for receiving responses from the server. Further included is a Shared Storage Interface Subsystem (SSIS) linked to the NECS and coupled by the direct access communication link to the data storage facility, the SSIS for providing accelerated access to and accelerated retrieval from the data storage facility. Additionally included is a Request Router (RQR) coupled to the NECS, to the SCS and to the SSIS. The RQR for forwarding the user request for retrieval of the response from the data storage facility, through the SSIS and the direct access communication link, in presence of the at least one condition, and from the server through the SCS and the NECS, in absence of the at least one condition. The ORA and the server may access the data storage facility concurrently.

It is a supplementary object of the present invention to provide an acceleration method further including, at the NECS, fetching, parsing and analyzing an incoming user request, and forwarding the parsed user request to the RQR. Also, at the RQR, searching the parsed user request to detect presence of the at least one condition, further including the steps of detecting presence of the at least one condition and forwarding the user request for retrieval of the response thereto from the data storage facility through the direct access link and through the SSIS. In the RQR, there occurs further detecting absence of the at least one condition and forwarding the user request to the server through the SCS.

It is yet another object of the present invention to provide an acceleration method further including, at the SCS, receiving the parsed user requests forwarded by the RQR, rebuilding the user requests, and sending user requests to the server, and returning server responses through the SCS and the NECS to the user.

It is yet also an object of the present invention to provide an acceleration method wherein the SSIS includes a metadata table coupled to the RQR, the metadata table for containing information representative of objects saved in the data storage facility, and an update engine coupled to the metadata table for building and for updating the metadata table. The SSIS also includes a retrieval request generator for accessing objects in the data storage facility, the retrieval request generator being coupled to the metadata table and a storage response receiver for receiving objects from the data storage facility, the storage response receiver being coupled to the NECS. The SSIS further includes a data storage interface for sending objects to and for receiving objects from the data storage facility, the data storage interface being coupled to the update engine, to the retrieval request generator, to the storage response receiver and to the data storage facility.

It is yet a further object of the present invention to provide an acceleration method wherein operation of the RQR further includes extracting an object name from a parsed user request, detecting adequacy of type of the object name and searching the metadata table for the extracted object name. The search includes accepting the at least one condition as present when the extracted object name is found in the metadata table, and regarding the at least one condition as absent upon failure to find the extracted object name in the metadata table.

It is yet also an additional object of the present invention to provide an acceleration method wherein accelerated access to the data storage facility via the SSIS includes building the metadata table. The metadata table operates by first translating the name of an object contained in a user request into a unique signature and relating the unique signature to a physical location of the object in the data storage facility. Also included are deriving a signature from the object name in the user request, and searching the metadata table to find the unique signature listed therein to derive therefrom the related physical location of the requested object and gaining direct access thereto for responding to the user request.

It is yet one more object of the present invention to provide an acceleration method wherein operation of the metadata table includes starting, on power-on of the ORA, building the metadata table by running the update engine, updating the metadata table by running the update engine in repeated update cycles, and ending operation, on intentional or unintentional shut-down of the ORA.

It is yet one more object of the present invention to provide an acceleration method including building the metadata table by running the update engine for an initial scanning of the contents of the data storage facility to retrieve metadata indicative of objects residing therein, and for saving retrieved metadata in the metadata table. Also included are updating the metadata table by running an update scanning to detect and to retrieve metadata indicative of change in the contents of the data storage facility and for saving retrieved metadata in the metadata table, and repeating the update scanning to update the metadata table at intervals.

It is still an object of the present invention to provide an acceleration method wherein building of the metadata table further includes accepting user requests during initial scanning, accessing the metadata table concurrently with the initial scanning, and detecting the at least one condition at rate of success correlative with progress of the initial scanning.

It is still an object of the present invention to provide an acceleration method wherein returning to the user(s) responses to requests further includes receiving responses from the server and from the direct access communication link and determining a dynamic threshold as a limit to memory resources allocated to store the responses received before sequential return thereof to the users. The dynamic threshold limit being determined in correspondence with total memory resources available, with the number of active connections and with the throughput capabilities thereof, accepting user requests when the limit is respected, and suspending acceptance of user requests when the limit is exceeded, acceptance being resumed upon return of the threshold to below the limit.

It is still an object of the present invention to provide an acceleration method further including defining a predetermined group of data objects as a selected group, and building and updating the metadata table in association restricted to metadata of the selected group, to further increase speed of response of the ORA.

It is still a further object of the present invention to provide an acceleration method wherein updating of the metadata table further includes saving contents of the metadata table in non-volatile memory at the end of each update-scanning run.

It is still an additional object of the present invention to provide an acceleration method wherein operation of the metadata table further includes building the metadata table initially by downloading last saved contents from the non-volatile memory to the metadata table, and updating the metadata table by running an update scanning to detect and to retrieve metadata indicative of change in the contents of the data storage facility, and saving retrieved metadata in the metadata table.

It is still an additional object of the present invention to provide an acceleration method wherein repeating the update scanning further includes repeating the update scanning at intervals of predetermined duration, as well as sensing a load of user requests, and repeating the update scanning at intervals correlated to the load sensed.

It is still a supplementary object of the present invention to provide an acceleration method wherein repeating the update scanning further includes sensing a load of user requests on the RQR, and repeating the update scanning at interval duration defined in operative association with the load sensed on the RQR.

It is further an object of the present invention to provide an acceleration method wherein repeating the update scanning further includes running a first background computer program on the server for sensing a load of user requests, sensing the load of user requests on the server and notifying the ORA thereof through the SCS, and repeating the update scanning at interval duration defined in operative association with the load sensed on the server.

It is moreover a supplementary object of the present invention to provide an acceleration method further including running a second background computer program on the server to detect a server-initiated change to objects in the data storage facility, and when change is detected, sending a signal to the ORA through the SCS, and repeating the update scanning in operative association with the signal from the second background computer program.

It is another object of the present invention to provide a method for accelerating responses to requests made by users coupled to an Internet environment, the Internet environment including a server and a shared storage, the server being coupled to the Internet and to the shared storage. The method including the steps of inserting an object response accelerator (ORA) in the Internet environment between the Internet and the server, the ORA being coupled to the Internet, to the server and to the shared storage. The ORA receiving each request from each user for the purpose of making a response-routing decision and then, routing the request according to the decision, the response-routing decision including analyzing the request to determine whether the response to the request pertains to a first case or to a second case. The first case indicating that the response may be obtained via the ORA and directly from the shared storage and the second case indicating that the request must be processed by the server. The response-routing including in the first case, routing the request from the ORA for retrieval of the response from the shared storage, retrieving the response and returning the response from the shared storage through the ORA and through the Internet to the user. In the second case, routing the request from the ORA to the server, for the response to be processed by the server, and forwarding the processed response from the server via the Internet to the user.

It is also an object of the present invention to provide an acceleration method for accelerating return of a response object to a user request received from a user coupled by an Internet to a server, and the server being coupled to a data storage facility through the Internet, the response-object being returned to the user from the server. The acceleration method including the steps of coupling an ORA to the Internet, and adding a direct access communication link between the ORA and the data storage facility. Further, routing the user request to the ORA, detecting presence, on the user request, of at least one condition for retrieval of the response object from the data storage facility through the direct access communication link and bypassing the server through the direct access communication link in presence of the at least one condition. Thereby, accelerating access to the data storage facility and accelerating return of the response object retrieved therefrom. Furthermore, forwarding the user request to the server, for the server to return the response object to the user in absence of the at least one condition.

It is yet another object of the present invention to provide an acceleration method further including, at the SCS, receiving the parsed user requests forwarded by the RQR, rebuilding the user requests, and sending user requests to the server, and returning server responses through the SCS and the NECS, via the Internet, to the user.

It is an object of the present invention to provide a system for accelerating a response to a user request received from a user coupled by an Internet to a server, the server being coupled to a data storage facility for returning the response fetched therefrom to the user. The system including an object response accelerator (ORA) coupled to the Internet, and a direct access communication link coupling the ORA to the data storage facility, the direct access communication link bypassing the server for accelerated access to the data storage facility and for accelerated return of the response to the user, whereby the ORA relieves processing load from the server. The system further includes a mechanism operating on the user request for detection of a capacity to retrieve the response from the data storage facility through the direct access communication link. Also, the response to the user request is returned to the user through the direct access communication link, when the mechanism detects the capacity, and the response to the user request is returned to the user through the server, upon failure of the mechanism to detect the capacity.

It is another object of the present invention to provide a system for accelerating receiving of responses to requests made by users coupled to an Internet environment, the Internet environment including a server and a shared storage, the server being coupled to the Internet and to the shared storage. The system including an object request accelerator (ORA) inserted in the Internet environment between the Internet and the server, the ORA being coupled to the Internet, to the server and to the shared storage for the ORA to receive each request from each user for the purpose of making a response-retrieval decision and then, routing the request in accordance with the decision. The response-routing decision including analysis of the user request to determine whether the response to the request pertains to a first case or to a second case, the first case indicating that the response may be obtained via the ORA and directly from the shared storage and the second case indicating that the request must be processed by the server. The routing including in the first case, routing the request from the ORA for retrieval of the response from the shared storage, retrieving the response and returning the response from the shared storage through the ORA and through the Internet to the user, and in the second case, routing the request from the ORA to the server, for the response to be processed by the server, and forwarding the processed response from the server via the ORA and via the Internet to the user.

It is also an object of the present invention to provide a system for accelerating receiving of responses to requests made by users coupled to an Internet environment, the Internet environment including a server and a shared storage, the server being coupled to the shared storage. The system includes an ORA coupled to the Internet, the ORA receiving a user request, and a direct access communication link coupling the ORA to the data storage facility. There is also a mechanism for detecting presence on the user request of at least one condition necessary to retrieve the response object from the data storage facility through the direct access communication link, the response to the user request being returned through the direct access communication link in bypass of the server when the at least one condition is detected present and the user request being forwarded to the server for return therefrom to the user, when the at least one condition is detected absent.

It is a further object of the present invention to provide a system further including an ORA bypass for direct linking of the Internet to the Server, and a software-sensor for detecting normal operation of the ORA, the software-sensor commanding bypass of the ORA through the ORA-bypass upon detection of absence of normal operation of the ORA.

It is an additional object of the present invention to provide a system wherein detecting presence of at one least one condition includes a type decision filter applied to the user request for detecting presence of a first condition out of the at least one condition, the first condition being indicative of adequacy of type of the user request, and a presence decision filter applied to the user request for detecting presence of a second condition out of the at least one condition, the presence filter for detecting representation of the response object in the ORA.

It is one more object of the present invention to provide a system wherein the ORA includes a Network Communication Subsystem (NECS) coupled to the Internet, the NECS for receiving user requests and for returning responses to the user(s). Also included is a Server Communication Subsystem (SCS) coupled to the server and to the NECS, the SCS for transmitting user requests to and for receiving responses from the server. Further included is a Shared Storage Interface Subsystem (SSIS) linked to the NECS and coupled by the direct access communication link to the data storage facility, the SSIS for providing accelerated access to and accelerated retrieval from the data storage facility. Additionally included is a Request Router (RQR) coupled to the NECS, to the SCS and to the SSIS. The RQR for forwarding the user request for retrieval of the response from the data storage facility, through the SSIS and the direct access communication link, in presence of the at least one condition, and from the server through the SCS and the NECS, in absence of the at least one condition. The ORA and the server may access the data storage facility concurrently.

It is a supplementary object of the present invention to provide a system wherein the NECS further includes an analysis mechanism for fetching, parsing and analyzing an incoming user request, and for forwarding the parsed user request to the RQR. The RQR further includes a query mechanism for searching the parsed user request to detect presence of the at least one condition. The query mechanism forwards the user request to the data storage facility for retrieval of the response therefrom through the direct access link and through the SSIS when detecting presence of the at least one condition, and the query mechanism forwards the user request to the server through the SCS when detecting absence of the at least one condition.

It is yet another object of the present invention to provide a system wherein forwarding the user request further includes, at the SCS, receiving the parsed user requests from the RQR in absence of the at least one condition, rebuilding the user requests, and sending the users requests to the server, and returning server responses to the user through the SCS and the NECS.

It is yet also an object of the present invention to provide a system wherein the SSIS includes a metadata table coupled to the RQR, the metadata table for containing information representative of objects saved in the data storage facility, and an update engine coupled to the metadata table, the update engine for building and for maintaining the metadata table updated. The SSIS also includes a retrieval request generator for accessing objects in the data storage facility, the retrieval request generator being coupled to the metadata table, a storage response receiver for receiving objects from the data storage facility, the storage response receiver being coupled to the NECS, and a data storage interface for sending objects to and for receiving objects from the data storage facility, the data storage interface being coupled to the update engine, to the retrieval request generator, to the storage response receiver and to the data storage facility.

It is yet a further object of the present invention to provide a system wherein operation of the RQR further includes an extraction mechanism for extracting an object name from the parsed user request, and a type-adequacy mechanism for detecting adequacy of type of the object name. The RQR also includes a search mechanism for searching the metadata table for the extracted object name, the search mechanism including an acceptance mechanism for accepting the condition as present when the extracted object name is found in the metadata table, and a rejection mechanism for regarding the condition as absent upon failure to find the object name in the metadata table.

It is yet an additional object of the present invention to provide a system wherein accelerated access to the data storage facility via the retrieval request generator includes a first procedure operated by the update engine for building the metadata table. The first procedure is for translation of the name of an object into a unique signature and for relating the signature to a physical location of the object in the data storage facility. There is also a derivation mechanism for deriving a signature from the object name in the user request, and a second procedure operated by the RQR for responding to a user request, the second procedure for searching the unique signature listed in the metadata table to derive therefrom the related physical location of the requested object and gaining direct access thereto.

It is yet one more object of the present invention to provide a system wherein operation of the metadata table includes a sequence for starting the ORA on power-on, for initializing building of the metadata table by help of the update engine, for updating the metadata table in repeated update cycles, and for ending operation, on intentional or unintentional shut-down of the ORA.

It is yet a supplementary object of the present invention to provide a system further including an initial scanning for scanning the contents of the data storage facility to retrieve therefrom metadata indicative of objects residing therein, the metadata being used for building of the metadata table, and an update scanning for scanning the contents of the data storage facility to detect therein and to retrieve therefrom metadata indicative of change in the contents of the data storage facility, the update scanning being repeated for updating the metadata table repetitively at intervals.

It is yet a supplementary object of the present invention to provide a system that further includes accepting user requests during initial scanning, accessing the metadata table concurrently with the initial scanning and a hit/miss mechanism for detecting presence of the at least one condition, the hit/miss mechanism scoring increased success hits correlative with progress of the initial scanning.

It is still an object of the present invention to provide a system wherein returning to the user(s) responses to requests further includes a dynamic threshold determining a limit to memory resources allocated to store responses received from the server and from the direct access communication link, responses being stored for sequential return thereof to the users, the dynamic threshold limit being determined in correspondence with total memory resources available, with the number of active connections and with the throughput capabilities thereof, wherein the user requests are accepted when the limit is respected, and wherein acceptance of user requests is suspended when the limit is exceeded, acceptance being resumed upon return of the threshold to below the limit.

It is still another object of the present invention to provide a system wherein a predetermined group of data objects is defined as a selected group, and the metadata table is built and updated in association restricted to metadata of the selected group, for further increase of response speed of the ORA.

It is still also an object of the present invention to provide a system wherein a non-volatile memory is used to store therein contents of the metadata table saved at the end of each update scanning.

It is still a further object of the present invention to provide a system wherein the metadata table is built by retrieving from the non-volatile memory contents of the metadata table last saved therein, and the metadata table is updated by running the update scanning to detect and to retrieve metadata indicative of change in the contents of the data storage facility, and saving retrieved metadata in the metadata table.

It is still a further object of the present invention to provide a system wherein the update scanning is repeated at intervals of predetermined duration and wherein a first sensor is configured to sense a load of user requests, and the update scanning is repeated at intervals correlated to the load sensed.

It is still an additional object of the present invention to provide a system wherein a second sensor is configured to sense a load of user requests on the RQR, and the update scanning is repeated at interval duration defined in operative association with the load sensed on the RQR.

It is still one more object of the present invention to provide a system wherein a first background computer program is run on the server for sensing a load of user requests thereon, and the ORA is notified through the SCS of the load of user requests sensed on the server, and the update scanning is repeated at interval duration defined in operative association with the server.

It is still one more object of the present invention to provide a system further including a second background computer program running on the server to detect a server-initiated change to objects residing in the data storage facility, and when change is detected, sending a signal to the ORA through the SCS, and the update scanning is repeated in operative association with the signal from the second background computer program.

It is still a supplementary object of the present invention to provide a system wherein the ORA includes at least a processor, a memory, a plurality of communication adapters for internet and data storage facility access, and a real time operating system and software application computer programs for execution of the operation of the ORA.

It is another object of the present invention to provide a system for accelerating responses to requests made by users coupled to an Internet environment, the Internet environment including a server and a shared storage, the server being coupled to the Internet and to the shared storage. The system including an object request accelerator (ORA) inserted in the Internet environment between the Internet and the server, the ORA being coupled to the Internet and to the shared storage, the ORA receiving each request from each user for the purpose of making a response-retrieval decision and then, routing the request according to the decision. The response-origin decision including analysis of the user request to determine whether the response to the request pertains to a first case or to a second case, the first case indicating that the response may be obtained via the ORA and directly from the shared storage and the second case indicating that the request must be processed by the server. The routing including in the first case, routing the request from the ORA for retrieval of the response from the shared storage, retrieving the response and returning the response from the shared storage through the ORA and through the Internet to the user, and in the second case, routing the request from the ORA to the server, for the response to be processed by the server, and forwarding the processed response from the server via the Internet to the user.

It is also an object of the present invention to provide a system for accelerating return of a response-object to a user request received from a user coupled by an Internet to a server, the server being coupled to a data storage facility and to the Internet, the response-object being returned to the user from the server. The acceleration system including an ORA coupled to the Internet, and a mechanism for detecting presence on the user request of at least one condition necessary to retrieve the response object from the data storage facility through the direct access communication link, the response to the user request being returned through the direct access communication link when the at least one condition is detected present and the user request being forwarded to the server for return therefrom to the user, when the at least one condition is detected absent.

It is a further of the present invention to provide a system wherein detecting presence of at least one condition includes a type decision filter applied to the user request for detecting presence of a first condition out of the at least one condition, the first condition being indicative of adequacy of type of the user request, and a presence decision filter applied to the user request for detecting presence of a second condition out of the at least one condition, the presence filter for detecting representation of the response object in the ORA.

It is a further of the present invention to provide a system wherein forwarding the user request in absence of the at least one condition including, at the SCS, receiving the parsed user requests forwarded by the RQR, rebuilding the user requests, and sending user requests to the server, and returning server responses through the SCS and the NECS to the user.

BRIEF DESCRIPTION OF THE DRAWINGS

The present invention will be understood and appreciated more fully from the following detailed description taken in conjunction with the drawings in which.

DISCLOSURE OF THE INVENTION

The embodiments, which will be described below, relate to the acceleration of the response time needed to satisfy the requests forwarded by the users of an internet to a server of the computer network.

To keep the explanations simple, reference will from now on be made to a single user 1, or client 1, and to a single server 3, instead of a plurality of both the former and the latter.

Figure 1:
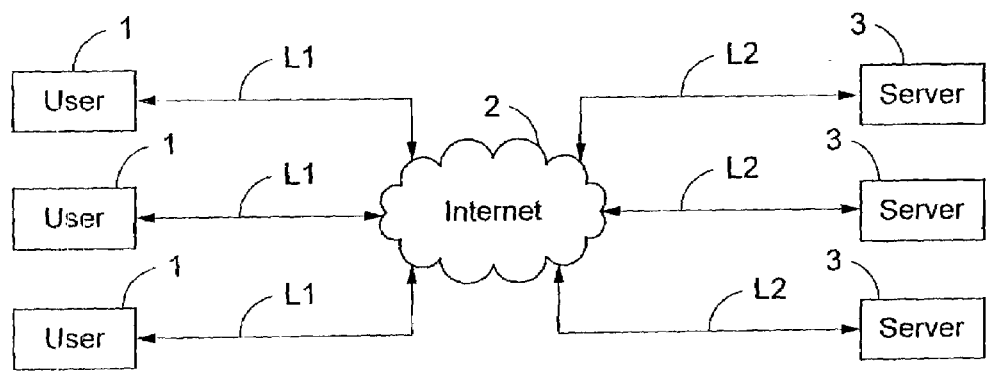
FIG. 1 is a schematic representation of an Internet, as known from the prior art.
Figure 2:
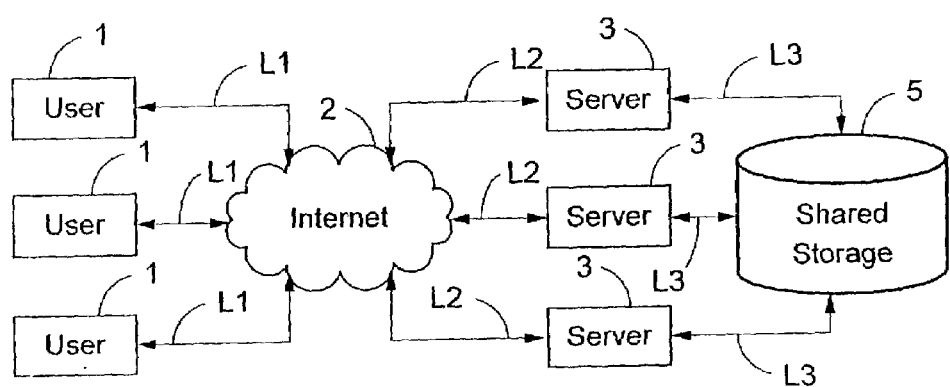
FIG. 2 shows an Internet such as in FIG. 1 with the addition of a shared Storage Network, also known from the prior art.
Figure 3:
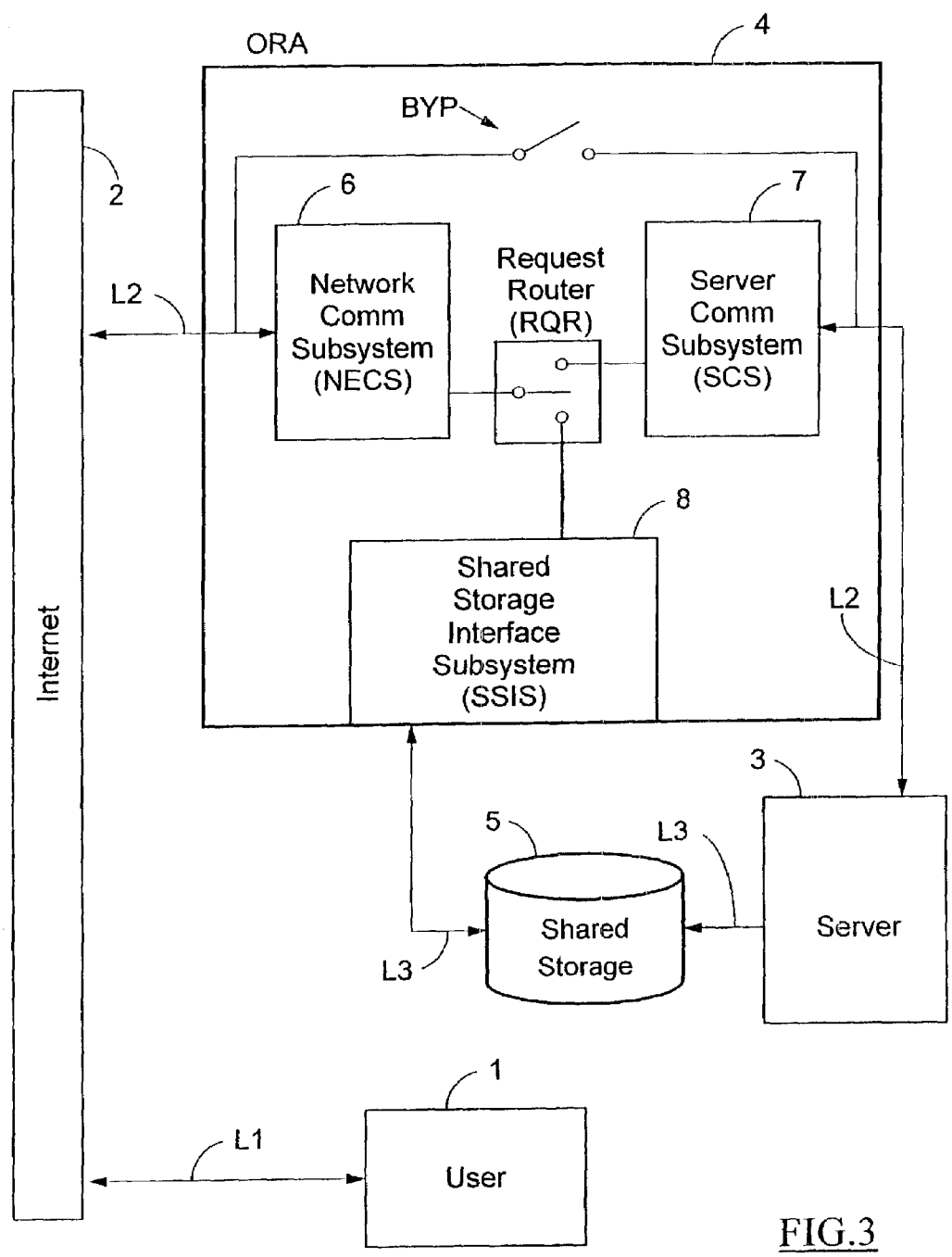
FIG. 3 illustrates a first embodiment of the present invention using the same conventions as in FIG. 2.

With reference to FIG. 3 there is shown a block-diagram illustrating the concept of the present invention. The same numerals designate the same elements in the various drawings. A user 1 is connected to an Internet 2 linked to a server 3, the server 3 being coupled to a Shared Storage 5. In between the Internet 2 and an Internet server 3, or server 3, there is inserted an Object Request Accelerator (ORA) 4, or simply, an accelerator 4. Both the server 3 and the object request accelerator 4, or ORA 4, which will be exposed in detail below, are coupled to a Shared Storage 5.

The ORA 4 includes four main subsystems, namely a Network Communication Subsystem 6, or NECS 6, a Server Communication Subsystem 7, or SCS 7, a Shared Storage Interface Subsystem 8, or SSIS 8, and a Request Router 9, or RQR 9. The ORA 4 is coupled to the Internet 2, to the server 3 and to the shared storage 5 by, respectively, a Network Communication Port, a Server Communication Port and a Shared Storage Interface Port, all last three not shown in FIG. 3 for the sake of simplicity.

In FIG. 3, a user 1, or client 1, sends requests over the Internet 2, to the server 3. These requests first reach the Network Communication Subsystem 6, or NECS 6 in the ORA 4 and then the Request Router 9, RQR 9. For the ease of explanation, the RQR 9 is depicted as a switch, or decision filter, which has the task to decide whether the request coming from the user 1 may be forwarded to the shared storage 5 through the Shared Storage Interface Subsystem 8, or SSIS 8, or to the server 3. If the SSIS 8 may take over, then the RQR 9 will switch the request therethrough to the shared storage 5 for receiving a response. The requested answer will return over the same path, thus retrograding from the shared storage 5, through the SSIS 8, the NECS 6 and the Internet 2, to the user 1. This deviation routing performed by the RQR 9 has bypassed the server 3, which is left free to process other requests, thereby relieving the load on the server 3 that is now able to exhibit faster response to requests thereto. Furthermore, the retrieval of a response from the shared storage 5 through the SSIS 8 is faster than retrieval from the server 3, as will be explained below. Should the RQR 9 decide that the SSIS 8 is not competent for the task, then the RQR 9 will forward the request through the Server Communication Subsystem 7, or SCS 7, for communication to the server 3. As above, data is returned from the server 3 over the same path as the request was received, reverting from the server 3 through the SCS 7, the NECS 6 and the Internet 2 to the user 1. Many times, it is unavoidable for the server 3 but to handle an incoming task. However, the net result of the introduction of the ORA 4 is that the SSIS 8 takes over a substantial portion of the workload conventionally performed by the server 3. The server 3, relieved for more important and less frequent assignments, now provides accelerated responses, as will be explained below.

Systems must be fault-tolerant and cope with errors and malfunctions and therefore, there is included an error-handling mechanisms. For example, there exists an error-sensor (not shown in FIG. 3 for the sake of simplicity) and a bypass BYP, enabling the linking of the Internet 2 directly to the server 3. The bypass BYP includes an error-sensor, i.e. a software-controlled electromechanical switch that maintains the ORA 4 connected between the Internet 2 and the server 3. However, if the system detects a malfunctioning of the ORA 4, then, the error-sensor orders release, thereby operating the bypass BYP to couple the Internet 2 directly to the server 3. The ORA 4 is now disconnected and the server 3 processes all users requests received from the Internet 2.

The default state of the electromechanical switch (e.g. with the ORA turned-off) is the bypass of the ORA and the connection of the server 3 directly to the Internet 1. Only when all the subsystems of the ORA 4 operate correctly does the switch-on state of the electromechanical switch connect the ORA in insertion between the Internet 2 and the server 3. The bypass BYP is not shown in the next Figures for the sake of simplicity.

Figure 4:
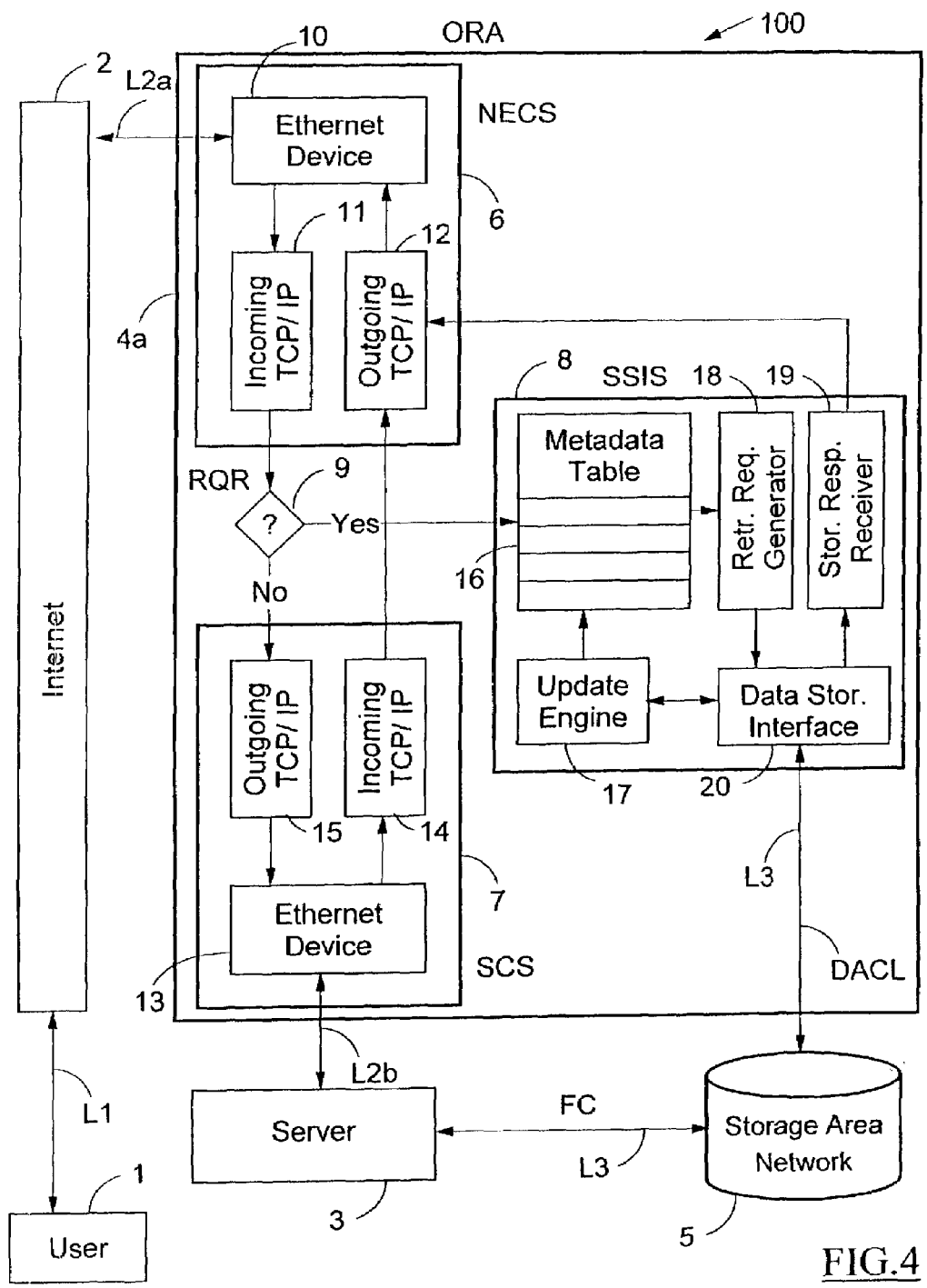
FIG. 4 depicts a first embodiment of FIG. 3 in more details.

With reference to FIG. 4, there is shown a first, preferred embodiment 100, with the ORA 4a being dedicated to accelerate the responses obtained by users 1, in an Internet 2 environment. In the configuration of FIG. 4, the ORA 4a is linked by an Ethernet link L2a to an Internet 2 and is connected to a server 3 by another Ethernet L2b. Moreover, the ORA 4a is also coupled to a shared storage, or data storage facility, via at least one Direct Access Communication Link, designated as DACL in FIG. 4. The at least one direct access communication link DACL couples the ORA 4a with the architecture of a storage area network 5 (SAN 5) and the latter is coupled to a server 3, via a link L3 implemented as a Fibre Channel. Both the server 3 and the ORA 4a may use the storage area network 5 (SAN 5) concurrently and simultaneously access data objects stored therein. The task of the ORA 4a is to lighten the burden placed on the server 3 by intercepting requests of a predetermined type, as will be explained below, to bypass the server 3 and return the required data faster than the server 3 could have achieved. The ability to bypass the server 3 and to accelerate responses to a user is accomplished by the operative association of the SAN 5 with the ORA 4a, both coupled to the Internet 2 and to the server 3.

It is understood that the term "shared storage 5" may indicate various modes of implementation, such as for example a Storage Area Network and SCSI Disks. Shared storage will thus designate any type of memory storage capacity in general, as long as that memory may be accessed concurrently by the ORA and by the server 3.

Subsystems of the ORA

As mentioned above, the ORA 4a includes four main subsystems, namely the NECS 6, the Server Communication Subsystem (SCS) 7, the Shared Storage Interface Subsystem (SSIS) 8 and the Request Router 9, or RQR 9. In the preferred embodiment, the I/O devices for these subsystems are an Ethernet for the NECS and the SCS, and a Fiber Channel for the SSIS. The RQR 9 does not have any I/O devices.

The NECS 6 includes an Ethernet device 10, an incoming TCP/IP (Transmission Control Protocol/Internet Protocol) protocol handler 11, and an outgoing TCP/IP protocol handler 12. The NECS 6 is connected to the Internet 2 and replaces the communication port of the server 3, not shown in FIG. 4, on the network. The address and the port number of the server 3 have been given to the NECS 6, so that all the requests delivered from the Internet 2 to the server 3, arrive to the incoming TCP/IP protocol handler 11 through the Ethernet device 10.

The NECS 6 handles communication in two opposite directions, the first direction being from the Internet 2 to the RQR 9. The second direction returns responses not only from the server 3, through the SCS 7 and the NECS 6 to the Internet 2 but also, from the SAN 5 via the SSIS 8 and the NECS 6, to the Internet 2. Messages for the Internet 2 enter the NECS 6 from the outgoing TCP/IP protocol handler 12 and leave the NECS 6 through the Ethernet device 10.

The RQR 9 receives requests emanating from the Internet 2, through the NECS 6. These requests are first filtered and according to the results of the filtering, sent by the RQR 9 either to the SCS 7 or to the SSIS 8.

The SCS 7 includes the same elements as the NECS 6, namely an Ethernet device 13, an incoming TCP/IP protocol handler 14 and an outgoing TCP/IP protocol handler 15. The SCS 7 handles all the communications incoming into and exiting from the server 3 via the link L2b. Internet requests coming from the RQR 9 are sent to the server 3 over the outgoing TCP/IP protocol handler 15 and through the Ethernet device 13. Responses from the server 3 are accepted after first passing through the Ethernet device 13 and then via the Incoming TCP/IP protocol handler 14.

The SSIS 8 includes a Metadata Table 16, an Update Engine 17, a Retrieval Request Generator 18, a Storage Response Receiver 19, and a Data Storage Interface 20. (Alternative names, used in the past, were Directory Table 16 for the metadata table 16, Directory Table Update Engine 17 for the Update Engine 17, Storage Request 18 for the Retrieval Request Generator 18, Storage Response 19 for the Storage Response Receiver 19, and Fibre Channel Device 20 for the Data Storage Interface 20). A user request sent by the RQR 9 to the SAN 5 is converted to access requests in the physical storage location of the required object, translated and forwarded via the Data Storage Interface 20 and the Direct Access Communication Link DACL to the SAN 5. The Data Storage Interface 20 is coupled not only to the Retrieval Request Generator 18, but also to the Storage Response Receiver 19 and to the Update Engine 17. Data flows from the SAN 5 to the Internet 2 via the Direct Access Communication Link DACL and the Data Storage Interface 20, to the Storage Response Receiver 19 and to the NECS 6. Evidently, the responses enter the NECS 6 in the same way as the data coming from the SCS 7 enters the NECS 6, as was explained in detail above.

The Metadata Table 16, shown in FIG. 4, is a database of object names, such as a list of file names, and of data locations, or addresses, derived from the SAN 5. That Metadata Table 16 contains a representation of the objects used by the Server 3 to create, display, and navigate the Internet content (Web pages, FTP files, etc.) of the Server 3. The Metadata Table 16 is built and updated by the Update Engine 17, which retrieves information from the SAN 5. Information retrieval for the Metadata Table 16 is a result of a building and update process driven by demand, as will be explained below. The Update Engine 17 collects the information employed by the Server 3 to map logical object names into physical storage locations and employs that information, or metadata, to build and update the Metadata Table 16. That mapping process utilized by the Update Engine 17 is unique to each type of server 3, as each different server 3 runs a specific operating system using an individual file system. Therefore, the Update Engine 17 must operate with an appropriate algorithm adapted for the specific operating system supported by the Server 3. That adaptive algorithm service is provided by a software application program configured to identify the operating system of the server 3, as is described below.

To build and update the metadata table 16, the update engine 17 accesses the SAN 5 through the data storage 20 and the direct access communication link DACL.

Information Flow

The information flow will now be described, still with reference to FIG. 4. First, a request, such as a Get Object, arrives from a user 1, through the Internet 2 and the Ethernet link L2a, to the Ethernet device 10. The request is analyzed by the Incoming TCP/IP protocol handler 11 for IP and TCP information, after which the request reaches the RQR 9.

The RQR 9 runs a decision filter to direct user requests either via the SSIS 8 or else, via the SCS 7. To make that decision, the RQR 9 parses an incoming request according to type and to a list of request parameters. To qualify for local processing a user request must first feature an appropriate type and second, fulfill a condition of presence. By examining the request-type, a presence condition and the list of request parameters, the RQR 9 then determines if the request meets the criteria for allowing handling by the ORA 4a, thus by the SSIS 8.

First, the request is checked for type compatibility. When the request is, for example, for reading a static object, then, it is handled by the ORA 4a if the additional conditions are met. Else, as an example, for writing any object or for reading a dynamic object (that is built by the Server 3 when requested), then the request is directed to the Server 3.

When the user request-type qualifies, then the next step follows. To this end, the RQR 9 derives a file signature from the user request and searches the metadata table 16 for a match. If no match is found, then the request must be forwarded to the server 3. When the request matches, for example, for an object, which resides in the Shared Storage 5, then, it is handled by the ORA 4*a* autonomously. Else, as an example, for an object that is built by the server 3 in memory when requested, then the request is directed to the Server 3.

The ORA 4*a* is able to handle, for example, static HTTP (Hypertext Transfer Protocol) and FTP (File Transfer Protocol) requests autonomously, because these requests do not require the running of an application by the server 3 for building the object, but necessitate only the fetching of data objects from storage.

An Internet request, which may be processed autonomously by the ORA 4*a*, is sent from the RQR 9 to the SSIS 8. There, the retrieval request generator 18 looks up the metadata table 16 to find therein the physical location in which the object is stored in the SAN 5. Once the physical location is known, the retrieval request generator 18 commands the shared storage 5 to read the data in the specified storage location, thus at the specific address. As was explained above, the request retrieval generator 18 uses the metadata table 16 to access the SAN 5 through the data storage interface 20 and the direct access communication link DACL.

The object data read from the SAN 5 is returned to the user 1 through the direct access communication link DACL and the Fibre Channel Interface 20 to the storage response receiver 19. The Storage Response Receiver 19 formats the retrieved object for the Internet 2 and sends it to the user 1 via the NECS 6 as by the explanations provided above.

A request that cannot be handled autonomously by the ORA 4*a* is sent by the RQR 9 to the server 3 through the SCS 7. Thus, through the outgoing TCP/IP protocol handler 15, through the Ethernet device 13, and through the Ethernet link L2*b*, to the server 3. The server 3 then operates in the conventional fashion and sends the response to the Internet 2 and to the user 1 through the SCS 7, the NECS 6, and the Ethernet link L2*a*.

Since the ORA 4*a* is in fact an autonomous computer, it includes hardware elements such as a processor, a memory, and adapters for storage, server, and Internet connections. The computer software includes a real time operating system, I/O functions, and dedicated software application programs to implement the invention.

The communication subsystem software program for the data transfer operations referred to above, is described below.

Figure 5:
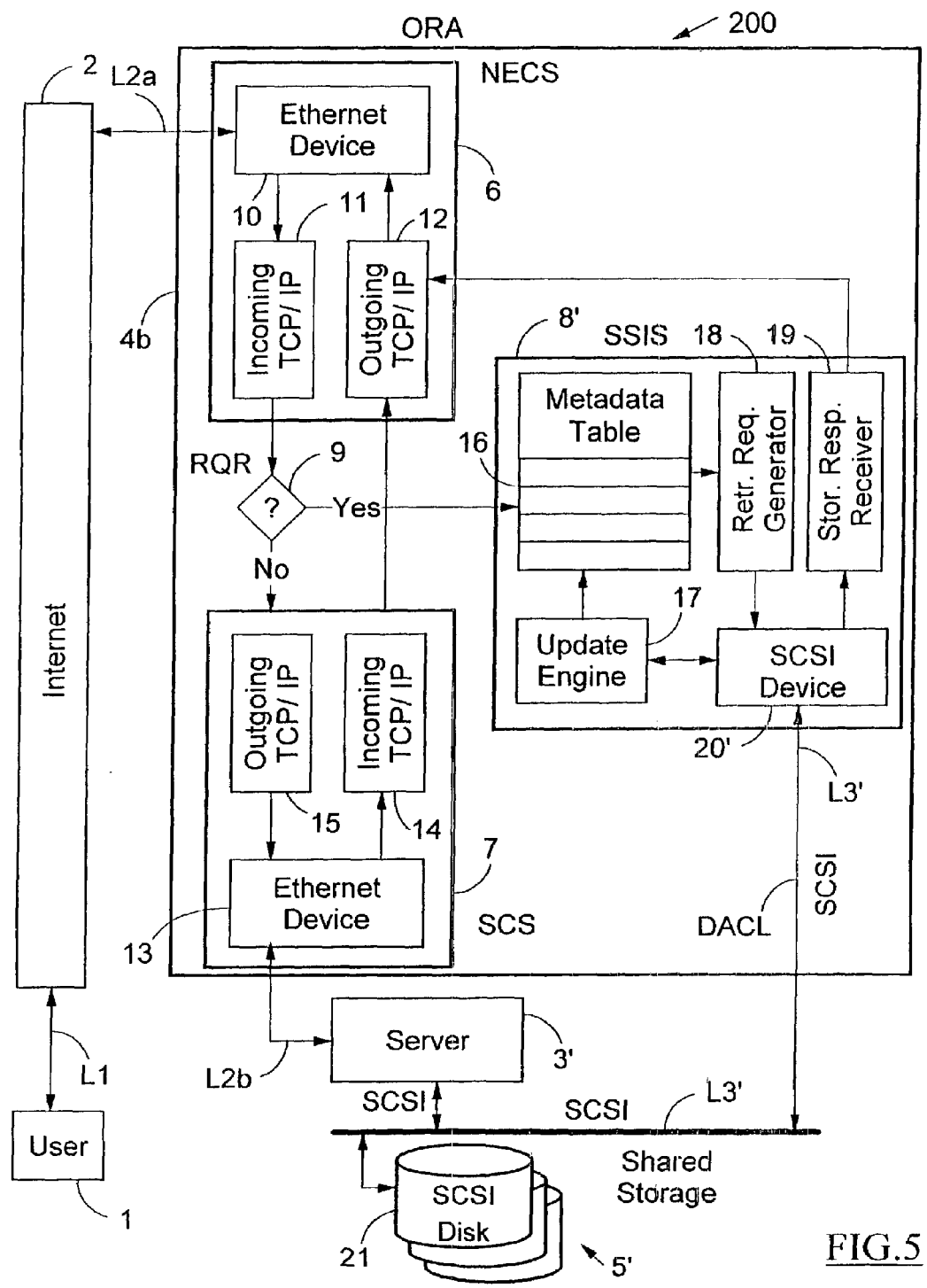
FIG. 5 is a variation of the first preferred embodiment shown in FIG. 4.

With reference to FIG. 5 there is shown an embodiment 200, similar to the preferred embodiment 100 of FIG. 4, but different for the method of accessing the shared storage 5'. In FIG. 5, the shared storage 5' is shown to include one or more SCSI disks 21. As the SCSI standard allows up to 15 devices to reside on and share the bus, it is possible to connect the ORA 4*b*, the server 3' and up to 13 SCSI disks 21 on the same SCSI bus. The links L3' are now a SCSI bus, and therefore, the SSIS 8' is now interfaced with the shared storage 5' through a SCSI device 20', in replacement of the fibre channel interface designated as data storage interface 20 in the embodiment 100 of FIG. 4.

The physical location of the single or many SCSI disks is irrelevant as long as the SCSI protocol and connection standards are adhered to. Evidently, the same applies to the interfaces and connectors of the ORA 4*b* and the server 3'. The single or many SCSI disks 21 may thus reside inside the enclosure of the server 3' or be packaged in a separate housing, provided the ORA 4*b* and the server 3' are coupled to the SCSI disks 21 by appropriate SCSI connectors and SCSI cables.

It should be pointed out that in the embodiment 200 the shared storage 5' is not available to other servers but restricted to the server 3' and the ORA 4*b* only.

Figure 6:
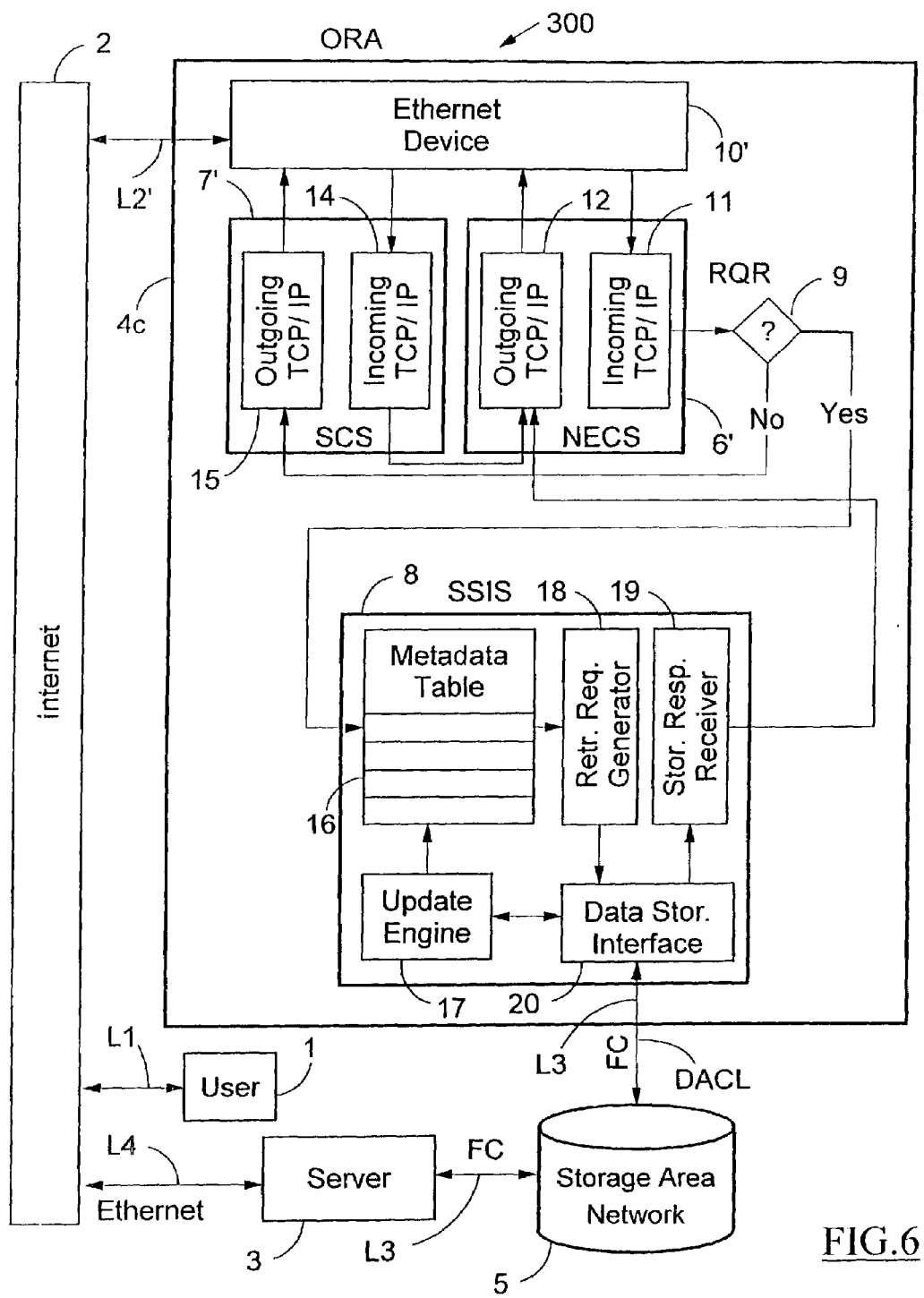
FIG. 6 illustrates a second embodiment of the present invention.

Another embodiment 300 is illustrated in FIG. 6. In contrast with the preferred embodiment 100 of FIG. 4, the same Ethernet device 10' is shared by both the NECS 6' and the SCS 7'. Most of the elements of the system remain the same but the routing has been modified to allow a single Ethernet device 10' instead of two separate Ethernet devices 10 and 13, located, respectively, in the NECS 6 and the SCS 7 of FIG. 4. Another difference regards the server 3, coupled as before to the shared storage 5 by links L3, but also connected to the Internet 2 by an Ethernet link L4 (the server 3 is the same, but the difference resides in the manner of connection).

The ORA 4*c* and the server 3 are both connected to the same Local Area Network (LAN) 2, or Internet 2, but the ORA 4*c* receives the IP address of the server 3 while the server 3 is given another non-public address. Thereby, when the users 1 send requests intended for the server 3, they actually access the ORA 4*c*. The RQR 9 operates as explained in the previous embodiments 100 and 200. Requests handled by the ORA 4*c* are processed as explained above, but those requests taken care of by the server 3, first leave the ORA 4*c* to the LAN L2' and enter the server 3 from the LAN through link L4. In the embodiment 300, all requests and responses, which are processed by the server 3, are transferred twice over the Ethernet link L2'. A request crosses the Ethernet link L2' heading for the ORA 4*c*, while the response passes the Ethernet link L2' in the direction of the user 1

Figure 7:
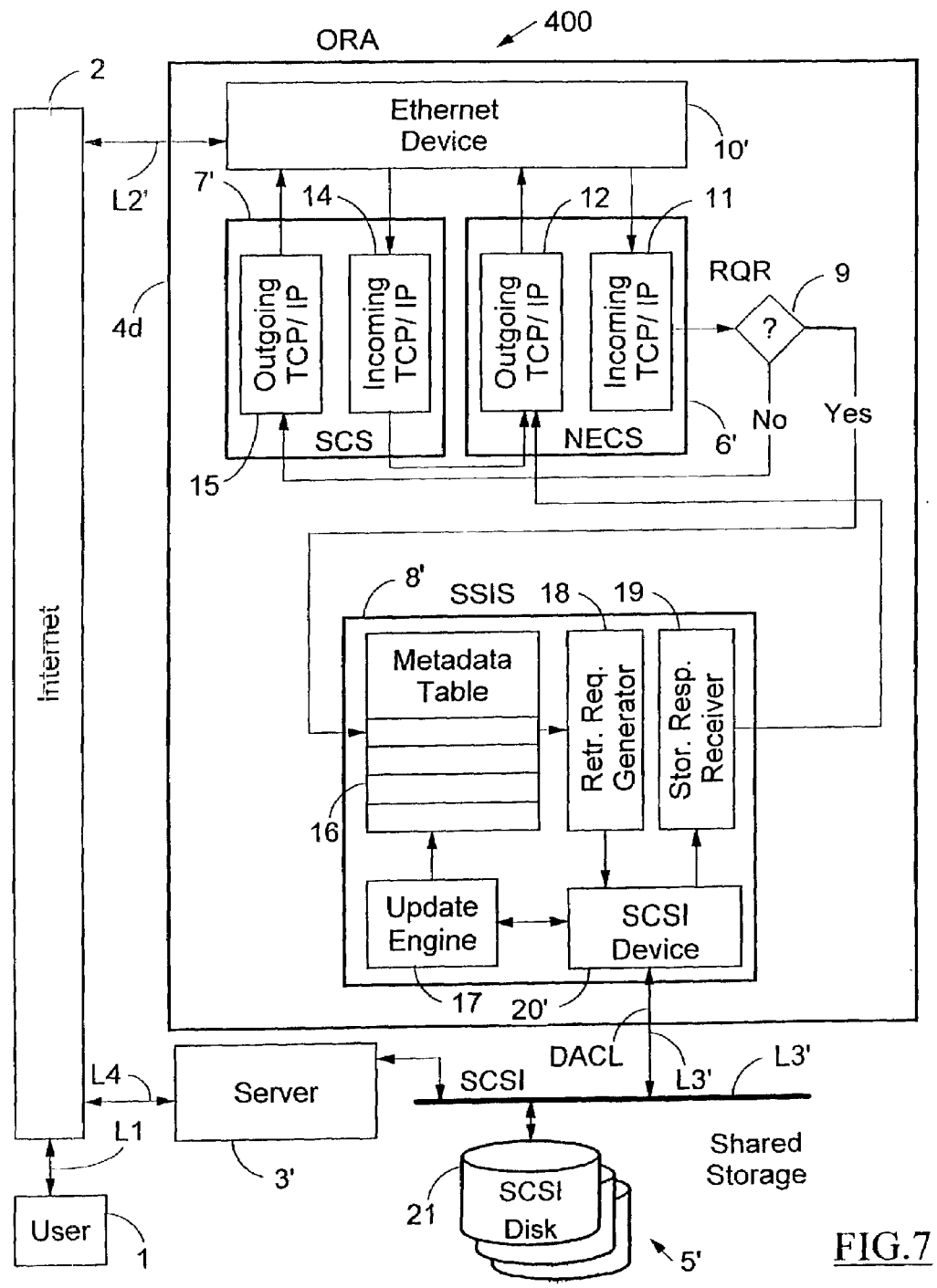
FIG. 7 is a variation of the second embodiment shown in FIG. 6.

The embodiment 400 illustrated in FIG. 7 combines a single Ethernet device 10', just as in the embodiment 300, with a SCSI shared storage 5' as shown in embodiment 200.

For a better understanding, all further explanations will relate to the embodiment 100 of FIG. 4, starting with the Communication Subsystem Software Program.

Communication Subsystem Software Program Description

Figure 8:
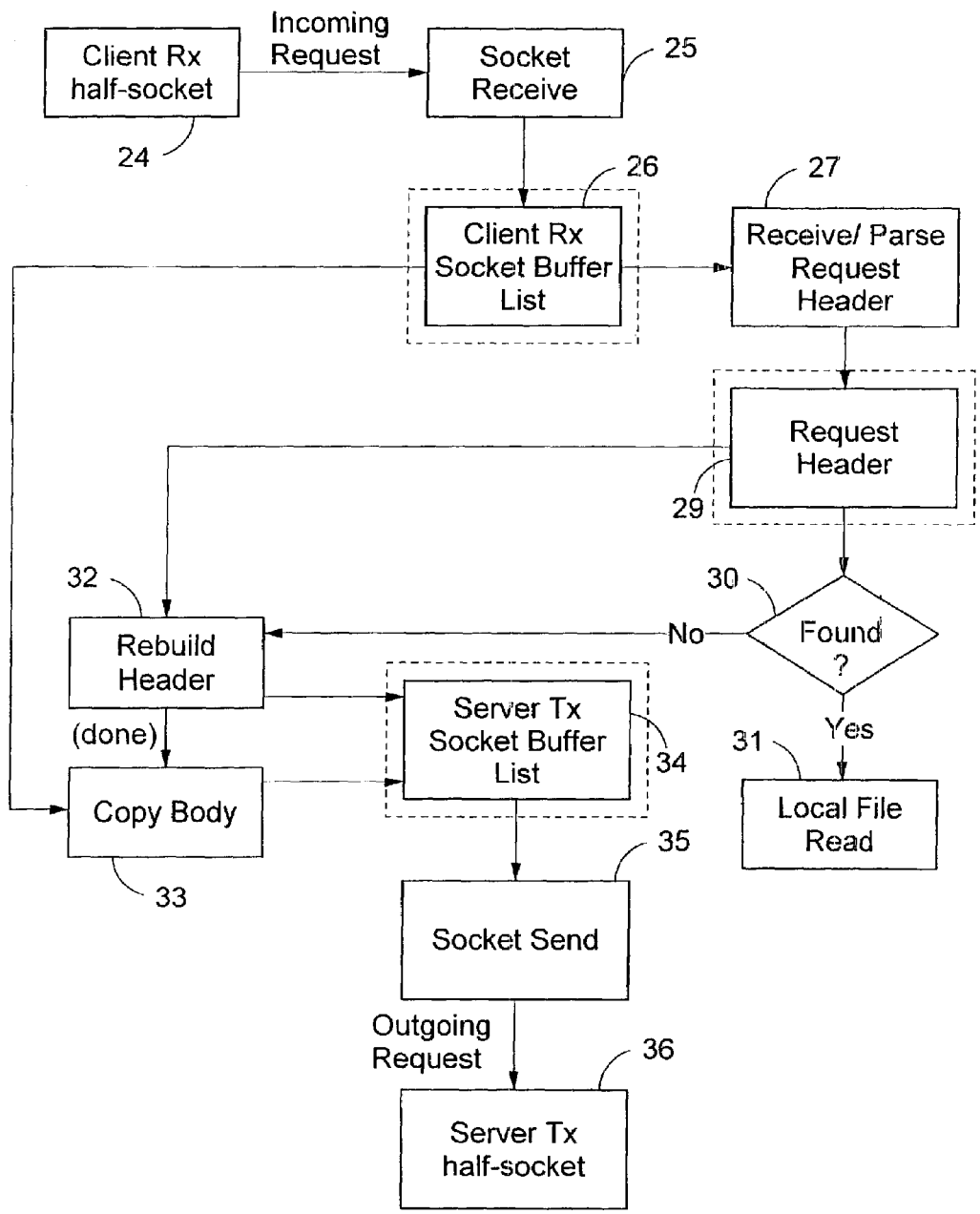
FIG. 8 illustrates the information flow of the Communication Subsystem Software regarding user requests.

The operation of the Communication Subsystem Software running the NECS 6, the SCS 7 and the SSIS 8 will now be described. Reference will first be made to FIG. 8 related to the NECS, then to FIG. 9 dealing with the SCS, and last, to the SSIS 8.

The NECS performs a double task. The first task is to forward to the user responses returned either via the direct access communication link DACL or from the server 3. The second task is to parse and to analyze data requests entered by users 1 of the Internet 2. Prior to parsing, the incoming user requests are stored in a buffer, after which they are parsed sequentially. The aim of the parsing is to determine, by help of the RQR 9, whether these user requests qualify for local processing. Local processing means, for example with reference to FIG. 4, processing by the ORA 4*a* for retrieving response through the SSIS 8 in direct communication with the shared storage 5. If qualifying, hence meaning that predetermined conditions are detected or met, then the users requests will be handled locally by the SSIS 8. In this case, the parsed request is used to find the correct physical storage location of the required object. The object representation is first found by help of the metadata table 16. Storage address finding and response retrieval will be explained below. It is emphasized that at the end of the process, the response must be formatted as an Internet response and only then, forwarded to the user 1.

User requests not meeting condition for local processing are directed by the RQR 9 to the server 3, through the SCS 7. However, the communication subsystem software must first rebuild the parsed user request before it is sent to the server 3. It should be noted that the parsed header of the user requests may be modified before being sent to the server 3, because the server and the user, or client 1, reside on separate TCP connections. When the server 3 returns responses, these responses are received and stacked in a buffer, for sequential retransmission to the user 1. Again, the responses may be rebuilt since, as mentioned above, different TCP connections are involved.

Still with reference to FIG. 4 and the embodiment 100, the Incoming TCP/IP 11 receives user requests. In practice, a number of Internet users 1, the number being limited only by exhaustion of system's resources, may initiate connections to the ORA 4a at any time. Each one of those connection requests creates a new Channel.

Definitions

By definition, a Channel is an object handling a user request. A Channel transfers data to and from a user 1, or client 1, and data may flow to and from the server 3, and to and from the SSIS 8. Actually, a Channel includes two connections: a first connection to a client port and a second connection to a server port, which is created only when and if the data is fetched from the server. A Channel also has a virtual port that is used to communicate with the SSIS 8. A Channel thus transfers data between a client port, a server port and a virtual storage port.

For the sake of clarity, more nomenclature dealing with terms used for communication purposes will be explained. A TCP connection is defined as a virtual data circuit linking the ORA 4 and another computer, either an Internet client 1, or an Internet server 3. TCP connections are the basic building blocks of Internet communication subsystems. TCP connections are bi-directional and full duplex. However, as the functionality and the type of data flowing in each direction is very different, it is more convenient to treat the Transmit function and the Receive function of the sockets as separate objects, called respectively, the Tx half-Socket and the Rx half-Socket.

A Socket Buffer is a fixed-size buffer utilized to store and manage all incoming and outgoing data. The socket buffers are allocated from a system-wide free pool, which is created during system initialization. Once freed, the socket buffer is returned to the pool.

Socket Buffer Lists are linked lists of socket buffers. Since Internet data may be of any size, socket buffer lists are used for the management of all incoming and outgoing data from all the sockets. Functions exist for the transmission and the reception of data exchanged between sockets and socket buffer lists.

Returning now to the Channel, it must be pointed out that functionally, a Channel includes two half-Channels: a Request half-Channel and a Response half-Channel. The Request half-Channel transfers requests from the client Rx half-socket to the server's Tx half-socket and to the virtual socket of the SSIS 8 (implemented by the Local File Read function 31 as shown below in FIG. 8). Likewise, the Response half-Channel forwards responses from the server's Rx half-socket as well as from the SSIS 8 virtual socket to the user's Tx half-socket.

Request Half-Channel Information Flow.

Referring now to FIG. 8, the information flow is described, for example, for an HTTP protocol. A Socket Receive function 25, on the TCP/IP protocol handler 11, handles an Incoming HTTP Request, including a Request Header and a Request Body, received from the Client Rx half-socket 24. The incoming request is saved in the client's Rx Socket Buffer List 26, which is a data structure. As data becomes available from the Client Rx Socket Buffer List 26, the HTTP Receive/Parse Request Header function 27, of the RQR 9 is called upon, to read and parse the Header of the Incoming Request and to update the HTTP Request Header data structure 29. In operation, the HTTP parse header function 27 parses the header of the request to detect fields of interest for the metadata table 16 of FIG. 4, as well as for the server Rebuild Header function 32. These fields are decoded and saved in the HTTP Request Header data structure 29, together with data previously entered therein by the Receive/Parse Request Header function 27.

It is now for the decision software 30, running on the RQR 9, to examine the read and parsed data contained in the HTTP Request data structure 29 to determine if the incoming request meets the conditions for a response through the SSIS 8.

The RQR 9 analyzes all incoming requests to detect a capacity for local processing by the ORA 4a (see FIG. 4). Local processing means handling of the request via the SSIS 8 and the at least one direct access communication link DACL instead of by the SCS 7 and the server 3. The RQR 9 will send a request that qualifies for local processing through the Retrieval Request Generator 18 and the Storage Interface 20. A user request that fails the capacity will be forwarded by the RQR 9, to the server 3. The RQR 9 thus applies a decision filter on the received user requests to direct a request either to the SSIS 8 or to the server 3. To qualify for local processing a user request must first exhibit an appropriate type and second, fulfill a condition of presence.

An appropriate type is, for example, a request for "reading of a static object", which type will probably always be adequate, since the ORA 4a inherently displays the competence of simply fetching and returning a response to a read command. Therefore, the level of competence of the RQR 9 determines the type of user requests regarded as adequate. Thus, an RQR 9 with a crude level of capability will handle only static objects. In contrast, a sophisticated RQR 9 may deal with semi-dynamic object requests and will therefore consider such a type of requests as adequate. A further enhancement in the performance of the RQR 9 may take care of multimedia, streaming and future developments, providing that the RQR 9 includes the features responding to the appropriate level needed. The decision that a user request is actually detected as being of the adequate type is evidently related to the level of refinement of the RQR 9.

To fulfill the condition of presence, the decision filter of the RQR 9 must also ascertain that a representation of the object requested, in response to the user request, is actually present and listed in the metadata table 16. This presence/absence checking procedure is performed by a query emanating from the RQR 9 and directed to the metadata table 16. When an object representation is detected as listed in the metadata table 16, then the response is retrievable through the data storage interface 20. An incoming request to be handled by the SSIS 8 is transferred to the Local File Read function 31. The Local File Read function 31 uses the Retrieval Request Generator 18 to send a data read request to the shared storage 5. The response is returned from the Storage Response Receiver 19 to the Local File Read function 31.

The RQR 9 thus detects both an adequacy of type of an incoming request and a condition of presence of a representation of the object requested in the Metadata Table 16.

Another important function fulfilled by the RQR 9 regards security. The RQR 9 presents a security screening function by filtering requests incoming from the Internet to prevent security violations. The RQR 9 checks permissions with the intention to deny access to unauthorized users 1.

Still with reference to FIG. 8, if the decision software 30 indicates that the incoming request is to be handled by the server 3, then that previously received and parsed request must first be rebuilt and updated before being passed to the server 3. To that effect, the request half-channel rebuilds the data, applying the HTTP Rebuild Header function 32, and utilizes the data stored in the HTTP Request Header data structure 29, although some fields may be modified. The Rebuild Header function 32 saves the rebuilt headers in the Server Tx Socket Buffer List 34, which is a data structure. In sequence, the Copy Body function 33 copies the body of the request from the client Rx Socket Buffer List 26, for the re-creation of the user request. Once the request header is rebuilt, the request's body is copied and attached to the header by help of the HTTP Copy Body function 33. The request header is sent to the Server Tx Socket Buffer List 34 as soon as it is completely rebuilt, even though the copy of the body is not yet completed. Meanwhile, the Copy Body function 33 sequentially continues to copy the rest of the request body from the Client Rx Socket Buffer List 26 to the Server's Tx half-Socket Buffer List 34 until the whole request body is copied. The rebuilt request is saved in the Server Tx Buffer List 34, ready for retrieval by the Socket Send function 35 and for communication through the Server Tx half-socket 36 to the server 3. Note that the Receive/Parse Request Header function 27, the Copy Body function 33 and the Socket Send function 35 operate concurrently and as soon as a chunk of data is received from the user, it is processed and queued to the Server's Tx half-Socket Buffer List 34

Response Half-Channel Information Flow

The response half-channel is similar to the request half-channel. However, it should be noted that the response half-channel handles responses retrieved through the SCS 7 from the server 3, as well as responses retrieved through the SSIS 8. Therefore, instead of storing responses in a buffer, these responses are stored in a FIFO structure of socket buffer lists. The FIFO data structure consequently presents a collection and distribution mechanism for returned responses. The Client Tx half-socket is thus provided with data emanating from the FIFO data structure in which, each entry is a separate Socket Buffer List for a response carrying a header, a body, and control information. The FIFO data structure allows the overlapping of multiple different requests and responses while keeping track and maintaining the correct order of these various requests and responses.

Figure 9:
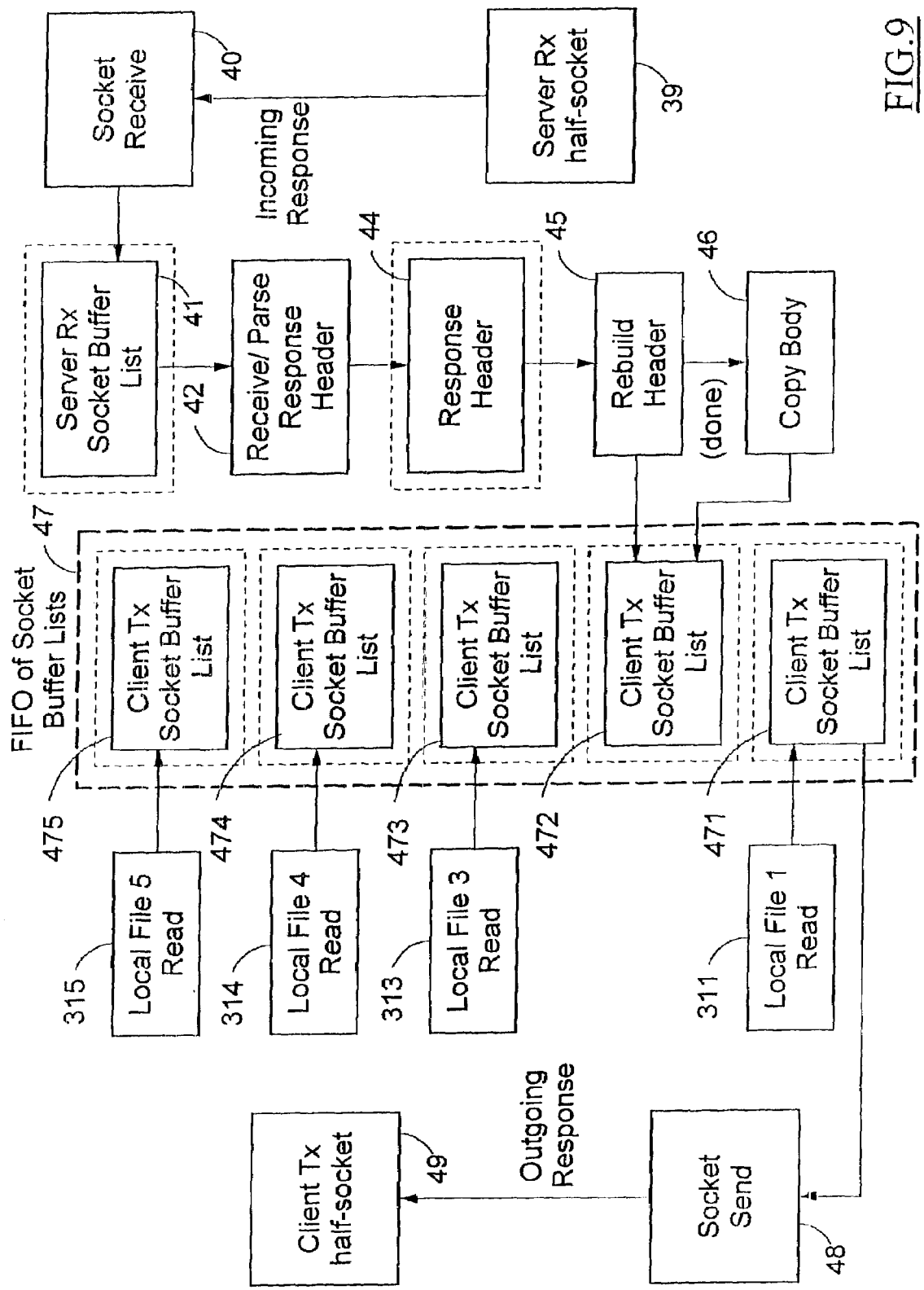
FIG. 9 shows the information flow of the Communication Subsystem Software with respect to returned responses.

With reference to FIG. 9, illustration is given regarding a response returned through the server 3. Information flows from the server 3 to the user 1, in the same fashion as was described above with reference to FIG. 4. A returned incoming HTTP response, including a response header and a response body, received from the Server Rx half-socket 39, is handled by the Socket Receive handler function 40 and saved in the Server's Rx Socket Buffer List 41 data structure. Under control of the HTTP protocol handler, the HTTP Receive Response/Parse Header function 42 is called upon, to read and parse the header of the returned response. The purpose of this last parsing operation of the header is to comply with the HTTP Protocol. Upon completion, the parsed response header residing in the HTTP Response Header data structure 44 is rebuilt, updated, and entered into the FIFO Socket Buffer Lists data structure 47. The sequence for attaching the body of the response to the header is the same as described above in relation with the rebuilding of a user request.

The FIFO Socket Buffer Lists 47 is configured to concurrently collect data from all pending responses from both the server 3 and from the Local File Read Function 31 (in FIG. 8) of the Storage Response Receiver 19, in the SSIS 8, shown in FIG. 4. For example, in FIG. 9, one response object emanating from the server 3 (File 2) is shown to be stored as a single Socket Buffer List 472 while four other responses originating from the SSIS 8, thus processed by the ORA 4a, are saved as separate Socket Buffer Lists 471, 473, 474 and 475.

Before sending the retrieved response to the user 1, these responses are first built, in the case of local files retrieved from local storage, or rebuilt, in the case of server responses. A Local File Read functions 31, and more specifically from 311 to 335 in this example, builds the header and adds the file content, thus appends the data retrieved from the shared storage, formatted for the required Internet protocol. For a response, which is retrieved from the Server 3, the process is almost identical with the process of first receiving, and then rebuilding a request, as described above, by use of the Rebuild Header function 45 and the Copy Body 46 function. The differences are as follows. First, there is no passing via the RQR 9, since all the server responses are forwarded to the user 1. Second, the Socket Send function 48 may be busy sending data from a previous, separate response. The Socket Send function 48 will not start retrieving data from the Buffer Lists data structure of responses 47 until the previous response in not completely dispatched.

The Socket Send function 48 accepts data from the top of the FIFO of Socket Buffer Lists 47 and continues to process until all the data from the Socket Buffer Lists 47 is sent. Then, the next buffer-list is processed. This procedure is adopted to keep the order of the responses identical to the order of the requests. Since responses to a user 1 may originate from the server Rx half-socket 39 in FIG. 9, as well as from a number of concurrent local file read operations 31 in FIG. 8, large amounts of data may be created and stored in wait for transmission. Therefore, a Data Throttling scheme, not shown in the Figures, is used to limit the amount of memory necessary to store the responses waiting to be sent to the user 1. This scheme consists of monitoring both the amount of memory occupied by pending connections and the speed of connection for accordingly, responding by slowing down data reception to match the available resources.

To prevent memory depletion, the data-throttling algorithm examines each outgoing data-stream. When too many responses await transmission, the Copy Body Function 46 will suspend the reception of user requests, until the number of stopped responses falls below a predetermined data-throttling threshold. The determination of the optimal data-throttling threshold is vital to the throughput of the whole system. Evidently, that threshold must be dynamic and depend on the amount of memory available, on the number of active connections and on the throughput capabilities of these connections. This data-throttling algorithm allocates a fair share of memory to each active connection.

Shared Storage Interface Subsystem Description

With reference to FIG. 4, the role of the SSIS 8 is to provide quick indication of object availability as well as rapid response to requests from users 1 received by the NECS 6 and sent to the RQR 9. To comply, the SSIS 8 must offer quick direct access retrieval of data objects from the SAN 5, through the Data Storage Interface 20. Reference is made here to the shared storage 5 with respect to FIG. 4 but this is only an example that represents one specific embodiment out of a whole range of a data storage facilities in general including, either SAN, or SCSI or any other shared storage.

Quick response retrieval capability is fully achieved when the SSIS 8 reaches complete operational capability and disposes of all the information required as well as of the latest updates relative to the contents of the SAN 5. To this end, specific data, named metadata, referring to the objects stored in the SAN 5, are extracted from the SAN 5 by the update engine 17, through the data storage interface 20, and saved in the metadata table 16.

The intention is also to render the ORA 4a operational from start and as fast as possible, even with initial partial capability and during transition from initial to full operational capacity. Upon power-on of the ORA 4a, the Update Engine 17 operates by running a first initial scanning, to scan the contents of the SAN 5 for extraction and saving in the Metadata Table 16 of that information necessary for the functioning of the SSIS 8, namely the metadata. The goal is to enable accelerated delivery of responses, already from the beginning of the initial scan, even though only part of the metadata has been scanned and saved in the metadata table 16.

When the end of the initial scanning is reached, the SSIS 8 is loaded with a representation of all the relevant information stored in shared storage facility, thus with all the metadata, but just for a static instant in time. During operation, the contents of the shared storage undergo changes, and therefore, after completion of the initial scanning, repeated continuous update scanning is required to maintain the Metadata Table 16 updated. There is thus a repetition of update scanning for the Metadata Table 16 to keep pace with the shared storage.

In addition to the initial scanning and to the repeated update scanning mechanism mentioned above, and to ensure rapid start of operation and constant update, the Metadata Table 16 is configured for quick retrieval of objects from the SAN 5 and for fast response to the user 1. However, since the Metadata Table 16 is a database designed to handle huge capacities of storage, in the order of magnitude of Terabytes and more, the endeavor of a fast response cycles is possible only if the Metadata Table 16 is organized efficiently, for example, by giving priority to most often used objects over least used objects. For the sake of database efficacy, the Metadata Table 16 includes the following four main components: File Descriptors, a Hash Table, a Partition Descriptor, and a Hierarchy Tree.

File Descriptor: a file descriptor is created for each object stored in the metadata table 16. The file descriptor holds essential object information such as: object signature, time stamp, object size, and object location on any storage disk belonging to the SAN 5. The file descriptor is the primordial entity that provides the metadata table 16 with the ability to quickly retrieve an object file from a storage disk without necessitating the procedure involved in conventional access to a storage system, such as through the server 3. Use of the file descriptor allows the retrieval procedure to achieve object identification, object freshness check, object location detection and object fetching. The file descriptor is thus a major resource of the ORA 4a system. The File Descriptors contain File Signatures.

File Signature: the file signature is a unique identifier, which allows the efficient recognition of the file descriptor out of hundreds of thousands of file descriptors.

Hash Table: the file descriptors Indexes are saved in the hash table and associated with the file signatures as identifiers. Since priority is deferred to some objects over others, care is taken for example, to store the most-often used objects at the beginning of each entry in the hash table to shorten response time. Partition Descriptor: the partition descriptor contains partition information such as: size of partition, location of partition beginning, physical location on the disk and type of file system.

Hierarchy Tree: The structure of object directories and files in the SAN 5 is organized as a hierarchical tree. The representation of these objects in the metadata table 16 maintains the same hierarchical tree as originally analyzed in the shared storage, mainly to accommodate update scanning, which maintains the metadata table 16 updated.

Operation of the Metadata Table 16

The metadata table 16 is turned on for operation, empty but ready, upon power-on of the ORA 4a. The update engine 17 then first starts the building the metadata table and later, continues to update the contents thereof. When the ORA 4a is eventually shut down, for any reason, the metadata table 16 is also turned off. As explained above, the metadata table 16 is initialized by running a first initial scanning of the contents of the SAN 5, followed by successive update scanning runs. To prevent a lengthy wait until the end of initial scanning, the ORA 4a permits use of the metadata table 16 during initialization. Evidently, less user requests are handled by the SSIS 8, thus by the ORA 4a, at the start of the initial scanning than later, when more objects are scanned and added to the metadata table 16. The hit rate thus increases with build-up progress, increasingly relieving the load of user requests handled by the server 3.

During initial scanning and update scanning of the metadata table 16, the metadata is retrieved from the SAN 5. Each object is stored with a unique file signature derived from its name. Then, the RQR 9 translates the name of a each requested object into the same unique signature that is used to find the representation of the object in the metadata table 16.

Many times not all of the objects stored in the SAN 5 do actually present interest. In such cases it becomes possible to define a selected group of data objects, composed of relevant data. If only the selected group of data objects is considered when building the metadata table 16, thus loading less metadata, then the response of the ORA 4a will be faster since less metadata needs to be searched.

To further speed up operation, instead of initializing the metadata table 16 anew after a shut down of the ORA 4a, it is advantageous to save a copy of the contents of the metadata table 16 in a non-volatile memory, preferably after every update scanning. Using that saved copy on power-on of the ORA 4a, the initial scanning run is replaced by a download of the last saved copy from that nonvolatile memory into the metadata table 16, thus again saving time. The nature of the non-volatile memory is irrelevant and for example, a flash memory will do and so may the SAN 5. The update scanning procedure remains unchanged.

Operation of the Update Engine 17

The ORA 4a supports data extraction from at least three different types of file systems, namely: NTFS, or NT File System, used by the Microsoft Win NT® or WIN 2000® operating system; UFS, or Unix File System, utilized by SUN for all the Solaris operating systems; and EXT2, or Extension 2, the file system adopted by Linux. Although different for each file system, the initiation process is similar.

(WIN NT and WIN 2000 are Registered Trademarks of Microsoft Corporation).

Initiation of the NTFS

With NTFS, all the partitions of the storage disks pertaining to the Storage Area Network 5, as an example of a shared storage, are recognized in an initial scanning run started on power-on of the ORA 4a. In that initial scanning, a singlepass scanning procedure recognizes files and directories and immediately allocates a File Descriptors to each one of them. At the same time, the information essential for the operation of the metadata table 16 is built, including file descriptors, file signatures, hash table, partition descriptors and the tree hierarchy. Within the same initial scanning procedure, the essential information is inserted into the hash table.

Initiation of the UFS and EXT2

The Unix File System and the Extension 2 File System are similar in many ways since the EXT2 is based on the UFS. Therefore, the initial scanning of the SAN 5 is similar but for minor differences.

In the initial scanning, all the information stored in Inodes tables (An Inode, or Unix File System Index Table, is a structure that uniquely identifies an object located on a disk) of the SAN 5 is read and analyzed. At the end the initial scanning, all the data objects on the disk(s) of the SAN 5 are recognized, including their physical location. In fact, the initial scanning consists of two parts. In the first part, the Inode tables are used to build the file descriptors and the partition descriptors. The second part of the initial scanning reads the directory structure of the shared storage to relate the file descriptors to the unique file signature and to the tree hierarchy. During that process the file descriptors are inserted in the hash tables.

Then comes the update scanning, which is the same as for the update of the NTFS-metadata table 16. In consequence, a metadata table 16 is created in the SSIS 8, independent and transparent to the type of file system. The SSIS 8 is intentionally implemented as a client with the duty to serve and support the performance of the RQR 9. This means that the SSIS 8 processes as much as possible to relieve the load on the RQR 9. For example, for allowing very fast checking of object information by using the file signature calculated by the RQR 9.

Application Interface

The flow of user requests from the NECS 6 through the RQR 9 to the SSIS 8 will now be explained with reference to FIG. 4. Although the ORA 4a already operates during the initialization phase, even before the completion of the initial scanning, the description will relate to the state reached when the metadata table 16 is fully built, thus when all the file descriptors are already organized in the hash table, since the process is similar.

The communication of data from the NECS 6 to the SSIS 8 is handled through the RQR 9. To start, the RQR 9 receives a user request from the NECS 6. Afterwards, the type of the user request is checked before continuing to the next condition. For example, for a static object read request, the RQR 9 first derives the object signature. Then, the RQR 9 searches for that signature in the metadata table 16, using the hash table. If a corresponding data object is not found, the RQR 9 is informed of the absence of the object and the user request is forwarded to the server 3. However, when the corresponding data object is found in the hash table, some additional checks referring to object freshness and to security authorization are preformed. Next, the data object is located by help of the retrieval generator 18, read from the appropriate disk of the SAN 5 and sent to the user 1 through the storage response receiver 19 and the NECS 6. As explained above, this procedure also operates partially during initialization even before the metadata table 16 is completely built.

To provide accelerated access to the data storage facility 5, the ORA 4a takes advantage of the metadata table 16 that implements a "flat" capability as opposed to the hierarchy tree structure imposed by a conventional access system. That "flat" organization of the metadata table 16 allows access to the object in one single access request instead of having to parse through a hierarchical tree requesting a succession of access requests.

To ensure accelerated return of responses to the user 1, the ORA 4a avoids the need to copy the retrieved response data objects internally between memory buffers, since copying is a time and resource consuming procedure. The response data objects fetched from the SAN 5, through the data storage interface 20 and the storage response receiver 19, are stored in buffers, as explained above. To prevent copying, it is sometimes necessary to disperse segments of a retrieved response data object into various transmission buffers. In that case, a storage request is built according to SCSI or Fibre Channel standards. These scattered response object transmission buffers are organized according to the requirements of the Internet protocols, and the response is rebuilt before return to the user 1. The NECS 6 allocates transmission buffers complying with the Ethernet Standard 802.3 limitations. Delivery of the retrieved response object is automatically taken care of through the storage response receiver 19 to the NECS 6 and the Ethernet L2a channel. The retrieval request generator 18 builds the storage command requests and the NECS manages the request buffers.

The update scanning of the ORA

The frequency of repetition of the update scanning is dependent on the activity detected by the ORA. That network activity may be sensed at the level of the RQR 9. Furthermore, a background application program (daemon) may be run on the server 3 for that same traffic-load sensing purpose. It is the task of the update engine 17 to perform the update scanning runs and of the storage data interface 20 to decide upon the update level of priority accorded to the update-scanning run.

The update-scanning run is necessary only when new data are stored in the SAN 5, or when previous data are modified and need to be to saved to keep the metadata table 16 updated. However, many different mechanisms are available to initiate an update-scanning run. For example, one might simply define a time interval of a predetermined duration between successive update scanning runs. It is more sophisticated to renew the update scanning at a frequency in operative association proportion with the load of user requests on the server. Moreover, it is straightforward to sense the load on the RQR 9 and to schedule an update scanning relative to the detected load.

Furthermore, running a background application program, or daemon, on the server 3 to detect load thereon, makes it possible to notify the ORA 4a of the detected load and to command repetition of the update scanning proportionally to the detected load. In the same manner, another background application program, or daemon, may run on the server 3 to detect server-initiated changes made to the SAN 5, for repeating update scanning accordingly.

The explanations given above according to the embodiment 100 shown in FIG. 4 remain in principle the same with regard to the embodiment 300 shown in FIG. 6, where the ORA 4c is implemented with a single Ethernet port. All communications flow in exactly the same way, except for the lowest level of the TCP/IP stack: all TCP connections share the same Ethernet Media Access Control (MAC) and the same physical devices.

As to the embodiments 200 and 400, depicted respectively in FIGS. 5 and 7, they represent variations consisting of a SCSI storage facility. For example, reference is made to FIG. 5, where the shared storage uses SCSI instead of Fibre Channel links, requiring just a different adapter and a (low level) device driver to access the shared storage. The metadata and the storage objects are organized and accessed in exactly the same way by both the server 3 and the ORA 4a. A minor alteration in the SSIS 8' of the ORA 4b consists of implementing the data storage interface 20' as a SCSI device, compatible with the SCSI links L3' and the SCSI disks 21 of the SAN 5'.

Hardware Architecture of the Preferred Embodiment 100

Figure 10:
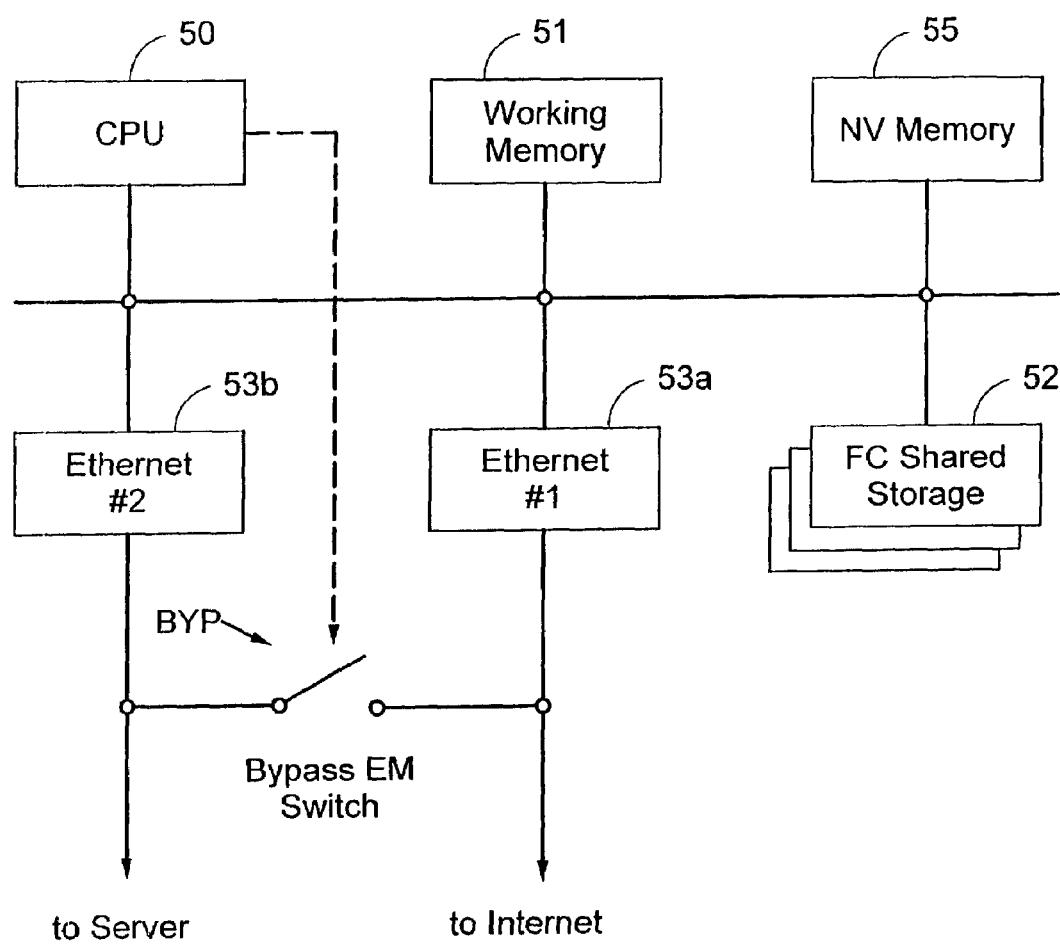
FIG. 10 is a basic block diagram of the main hardware components of the ORA.

A brief overview of some main hardware components of the ORA 4a, shown in FIG. 4 as embodiment 100, will now be described, as an example of a specific implementation. Reference is made to FIG. 10.

The ORA 4a includes the following major subsystems, referred to in FIG. 10, namely:
1. A fast CPU 50 for the management and the operation of the ORA 4a, currently implemented as a PowerPC CPU.
2. A working Read/Write memory 51 coupled to the CPU 50.
3. At least one Shared Storage I/O subsystem 52, implemented here as a FC Direct Access Communication Link DACL, although a SCSI link is also possible, for coupling to the shared storage 5.
4. At least one Ethernet I/O subsystem including a first Ethernet adapter 53a operated by the NECS, and a second Ethernet adapter 53b operated by the SCS, to couple the ORA 4a to, respectively, the Internet 2 and to the server 3.
5. A Bypass BYP, including a software-driven electromechanical switch, to maintain the ORA 4a coupled in insertion between the Internet 2 and the Server 3 when all the subsystems of the ORA 4a function properly. The switch of the Bypass 53c is released to the default setting when a malfunction is detected on the ORA 4a.
6. A Flash-EpROM 56 (non-volatile memory) containing all the software programs and parameters. When running, software is copied to the working memory 51 to enhance execution speed. Optionally, a flash-disk device may be added as well.

Other hardware elements, not shown in FIG. 10, include miscellaneous I/O elements including: UARTs, timers, RTCs, and support logic.

Thus, there has been described a new method and a novel system for the acceleration of the response time needed to satisfy requests forwarded by users 1 of an Internet 2 to a server 3 of the computer network. It is to be understood that the above-described embodiments are merely illustrative of some of the many specific embodiments, which represent applications of the principles of the present invention. Clearly, numerous and other arrangements can be readily devised by those skilled in the art without departing from the scope of the invention, such as, for example, using a WAN for Internet connectivity (T1, T3, Sonet, ATM and so on), and using storage over IP, for shared storage.

The invention claimed is:

1. An acceleration method for accelerating a response to a user request received from a user coupled by an Internet to a server, the server being coupled to a data storage facility for returning the response fetched therefrom to the user, the acceleration method comprising the steps of:
coupling an object response accelerator (ORA) to the Internet,
coupling at least one direct access communication link from the ORA to the data storage facility, and
bypassing the server through the at least one direct access communication link for accelerated access to the data storage facility and for accelerated return of the response to the user,
wherein the ORA relieves processing load from the server.

2. The acceleration method according to claim 1, further comprising the step of:
operating a mechanism on the user request for detecting a capacity for retrieval of the response from the data storage facility through the at least one direct access communication link.

3. The acceleration method according to claim 2, further comprising the steps of:
retrieving the response for return to the user from the data storage facility through the at least one direct access communication link, when the capacity is detected, and
retrieving the response for return to the user from the server, upon failure to detect the capacity.

4. The acceleration method according to claim 1, further comprising the steps of:
inserting the ORA between the Internet and the server,
coupling the ORA to the server,
receiving each request from each user for the purpose of making a response-routing decision, and
analyzing the request to determine whether the response to the request may be obtained via either the ORA and directly from the shared storage or must be processed by the server.

5. The acceleration method according to claim 4, wherein analyzing the request further comprising the steps of:
detecting presence, on the user request, of at least one condition for retrieval of a response object from the data storage facility through the at least one direct access communication link,
bypassing the server through the at least one direct access communication link in presence of the at least one condition, for accelerating access to the data storage facility and for accelerating return of the response object retrieved therefrom, and
forwarding the user request to the server, for the server to return the response object to the user in absence of the at least one condition.

6. The acceleration method according to claim 5, further comprising the steps of:
establishing an ORA bypass for linking of the Internet directly to the server, and
operating a software-sensor for detecting normal operation of the ORA, the software-sensor commanding bypass of the ORA through the ORA bypass upon detection of absence of normal operation of the ORA.

7. The acceleration method according to claim 5, wherein detecting presence of at least one condition comprises the steps of:
detecting adequacy of type of the user request, and
detecting representation of the response object in the ORA.

8. The acceleration method according to claim 5, wherein the ORA comprises:
a Network Communication Subsystem (NECS) coupled to the Internet, the NECS for receiving user requests and for returning responses to the user(s),
a Server Communication Subsystem (SCS) coupled to the server and to the NECS, the SCS for transmitting user requests to and for receiving responses from the server,
a Shared Storage Interface Subsystem (SSIS) linked to the NECS and coupled by the direct access communication link to the data storage facility, the SSIS for providing accelerated access to and accelerated retrieval from the data storage facility, and
a Request Router (RQR) coupled to the NECS, to the SCS and to the SSIS, the RQR for forwarding the user request for retrieval of the response, i) from the data storage facility, through the SSIS and the direct access communication link, in presence of the at least one condition, and ii) from the server through the SCS and the NECS, in absence of the at least one condition, for the ORA and the server to access the data storage facility concurrently.

9. The acceleration method according to claim 8, further comprising the steps of:

at the NECS:

fetching, parsing and analyzing an incoming user request, and forwarding the parsed user request to the RQR, and at the RQR:

searching the parsed user request to detect presence of the at least one condition, further comprising the steps of:

detecting presence of the at least one condition and forwarding the user request for retrieval of the response thereto from the data storage facility through the direct access link and through the SSIS, and detecting absence of the at least one condition and forwarding the user request to the server through the SCS.

10. The acceleration method according to claim 9, wherein forwarding the user request in absence of the at least one condition comprises the steps of: at the SCS:

receiving the parsed user requests forwarded by the RQR, rebuilding the user requests, and sending user requests to the server, and returning server responses through the SCS and the NECS to the user.

11. The acceleration method according to claim 8, wherein the SSIS comprises:

a metadata table coupled to the RQR, the metadata table for containing information representative of objects saved in the data storage facility, an update engine coupled to the metadata table for building and for updating the metadata table, a retrieval request generator for accessing objects in the data storage facility, the retrieval request generator being coupled to the metadata table, a storage response receiver for receiving objects from the data storage facility, the storage response receiver being coupled to the NECS, and a data storage interface for sending objects to and for receiving objects from the data storage facility, the data storage interface being coupled to the update engine, to the retrieval request generator, to the storage response receiver and to the data storage facility.

12. The acceleration method according to claim 9, wherein operation of the RQR further comprises the steps of:

extracting an object name from a parsed user request, detecting adequacy of type of the object name, searching the metadata table for the extracted object name, the search comprising:

accepting the at least one condition as present when the extracted object name is found in the metadata table, and regarding the at least one condition as absent upon failure to find the extracted object name in the metadata table.

13. The acceleration method according to claim 8, wherein accelerated access to the data storage facility via the SSIS comprises the steps of:

building the metadata table by first translating the name of an object contained in a user request into a unique signature and relating the unique signature to a physical location of the object in the data storage facility, deriving a signature from the object name in the user request, and searching, the metadata table to find the unique signature listed therein to derive therefrom the related physical location of the requested object and gaining direct access thereto for responding to the user request.

14. The acceleration method according to claim 11, wherein operation of the metadata table comprises the steps of:

starting, on power-on of the ORA, building the metadata table by running the update engine, updating the metadata table by running the update engine in repeated update cycles, and ending operation, on intentional or unintentional shutdown of the ORA.

15. The acceleration method according to claim 14, further comprising the steps of:

building the metadata table by running the update engine for an initial scanning of the contents of the data storage facility to retrieve metadata indicative of objects residing therein, and for saving retrieved metadata in the metadata table, updating the metadata table by running an update scanning to detect and to retrieve metadata indicative of change in the contents of the data storage facility and for saving retrieved metadata in the metadata table, and repeating the update scanning to update the metadata table at intervals.

16. The acceleration method according to claim 15, wherein building of the metadata table further comprises the step of:

accepting user requests during initial scanning, accessing the metadata table concurrently with the initial scanning, and detecting the at least one condition at rate of success correlative with progress of the initial scanning.

17. The method according to claim 8, wherein returning to the user(s) responses to requests further comprises the steps of:

receiving responses from the server and from the direct access communication link, determining a dynamic threshold as a limit to memory resources allocated to store the responses received before sequential return thereof to the users, the dynamic threshold limit being determined in correspondence with total memory resources available, with the number of active connections and with the throughput capabilities thereof, accepting user requests when the limit is respected, and suspending acceptance of user requests when the limit is exceeded, acceptance being resumed upon return of the threshold to below the limit.

18. The acceleration method according to claim 15, further comprising the step of:

defining a predetermined group of data objects as a selected group, and building and updating the metadata table in association restricted to metadata of the selected group, to further increase speed of response of the ORA.

19. The acceleration method according to claim 15, wherein updating of the metadata table further comprises the step of:

saving contents of the metadata table in non-volatile memory at the end of each update-scanning run.

20. The acceleration method according to claim 19, wherein operation of the metadata table further comprising the steps of:
   building the metadata table initially by downloading last saved contents from the non-volatile memory to the metadata table, and
   updating the metadata table by running an update scanning to detect and to retrieve metadata indicative of change in the contents of the data storage facility, and saving retrieved metadata in the metadata table.

21. The acceleration method according to claim 15, wherein repeating the update scanning further comprises the step of:
   repeating the update scanning at intervals of predetermined duration.

22. The acceleration method according to claim 21, wherein repeating the update scanning further comprises the steps of:
   sensing a load of user requests, and
   repeating the update scanning at intervals correlated to the load sensed.

23. The acceleration method according to claim 22, wherein repeating the update scanning further comprises the steps of:
   sensing a load of user requests on the RQR, and
   repeating the update scanning at interval duration defined in operative association with the load sensed on the RQR.

24. The acceleration method according to claim 22, wherein repeating the update scanning further comprises the steps of:
   running a first background computer program on the server for sensing a load of user requests,
   sensing the load of user requests on the server and notifying the ORA thereof through the SCS, and
   repeating the update scanning at interval duration defined in operative association with the load sensed on the server.

25. The acceleration method according to claim 22, further comprising the steps of:
   running a second background computer program on the server to detect a server-initiated change to objects in the data storage facility, and when change is detected, sending a signal to the ORA through the SCS, and
   repeating the update scanning in operative association with the signal from the second background computer program.

26. A system for accelerating a response to a user request received from a user coupled by an Internet to a server, the server being coupled to a data storage facility for returning the response fetched therefrom to the user, the system comprising:
   an object response accelerator (ORA) coupled to the Internet,
   at least one direct access communication link coupling the ORA to the data storage facility, the at least one direct access communication link bypassing the server for accelerated access to the data storage facility and for accelerated return of the response to the user,
   wherein the ORA relieves processing load from the server.

27. The system according to claim 26, further comprising:
   a mechanism operating on the user request for detection of a capacity to retrieve the response from the data storage facility through the at least one direct access communication link.

28. The system according to claim 27, wherein:
   the response to the user request is returned to the user through the at least one direct access communication link, when the mechanism detects the capacity, and
   the response to the user request is returned to the user through the server, upon failure of the mechanism to detect the capacity.

29. The system according to claim 26, wherein the analysis further comprises:
   the ORA being inserted between the Internet and the server, and being coupled to the server, to receive each request from each user for the purpose of making a response-retrieval decision, and
   the user request is analyzed to determine whether the response to the request may be obtained via the ORA and directly from the shared storage or must be processed by the server.

30. The system according to claim 29, the further comprising:
   a mechanism for detecting presence on the user request of at least one condition necessary to retrieve the response object from the data storage facility through the at least one direct access communication link, the response to the user request being returned through the at least one communication link in bypass of the server when the at least one condition is detected present, and
   the user request being forwarded to the server for return therefrom to the user, when the at least one condition is detected absent.

31. The system according to claim 30, further comprising:
   an ORA bypass for direct linking of the Internet to the Server, and
   a software-sensor for detecting normal operation of the ORA, the software- sensor commanding bypass of the ORA through the ORA-bypass upon detection of absence of normal operation of the ORA.

32. The system according to claim 30, wherein detecting presence of at one least one condition comprises:
   a type decision filter applied to the user request for detecting presence of a first condition out of the at least one condition, the first condition being indicative of adequacy of type of the user request,
   a presence decision filter applied to the user request for detecting presence of a second condition out of the at least one condition, the presence filter for detecting representation of the response object in the ORA.

33. The system according to claim 30, wherein the ORA comprises:
   a Network Communication Subsystem (NECS) coupled to the Internet, the NECS for receiving user requests and for returning responses to the user(s),
   a Server Communication Subsystem (SCS) coupled to the server and to the NECS, the SCS for transmitting user requests to and for receiving responses from the server,
   a Shared Storage Interface Subsystem (SSIS) linked to the NECS and coupled by the direct access communication link to the data storage facility, the SSIS for providing accelerated access to and accelerated retrieval from the data storage facility, and
   a Request Router (RQR) coupled to the NECS, to the SCS and to the SSIS, the RQR for forwarding the user request for retrieval of the response,
      i) from the data storage facility, through the SSIS and the direct access communication link, in presence of the at least one condition, and ii) from the server through the SCS and the NECS, in absence of the at least one condition, for the ORA and the server to access the data storage facility concurrently.

34. The system according to claim 33, wherein the NECS further comprises:
an analysis mechanism for fetching, parsing and analyzing an incoming user request, and for forwarding the parsed user request to the RQR, and
the RQR further comprises:
a query mechanism for searching the parsed user request to detect presence of the at least one condition, the query mechanism forwarding the user request to the data storage facility for retrieval of the response therefrom through the direct access link and through the SSIS when detecting presence of the at least one condition, and the query mechanism forwarding the user request to the server through the SCS when detecting absence of the at least one condition.

35. The system according to claim 33, wherein forwarding the user request further comprises: at the SCS:
receiving the parsed user requests from the RQR in absence of the at least one condition, rebuilding the user requests, and sending the users requests to the server, and
returning server responses to the user through the SCS and the NECS.

36. The system according to claim 33, wherein the SSIS comprises:
a metadata table coupled to the RQR, the metadata table for containing information representative of objects saved in the data storage facility,
an update engine coupled to the metadata table, the update engine for building and for maintaining the metadata table updated,
a retrieval request generator for accessing objects in the data storage facility, the retrieval request generator being coupled to the metadata table,
a storage response receiver for receiving objects from the data storage facility, the storage response receiver being coupled to the NECS, and
a data storage interface for sending objects to and for receiving objects from the data storage facility, the data storage interface being coupled to the update engine, to the retrieval request generator, to the storage response receiver and to the data storage facility.

37. The system according to claim 34, wherein operation of the RQR further comprises:
an extraction mechanism for extracting an object name from the parsed user request,
a type-adequacy mechanism for detecting adequacy of type of the object name,
a search mechanism for searching the metadata table for the extracted object name, the search mechanism comprising:
an acceptance mechanism for accepting the condition as present when the extracted object name is found in the metadata table, and
a rejection mechanism for regarding the condition as absent upon failure to find the object name in the metadata table.

38. The system according to claim 33, wherein accelerated access to the data storage facility via the retrieval request generator comprises:
a first procedure operated by the update engine for building the metadata table, the first procedure for translation of the name of an object into a unique signature and for relating the signature to a physical location of the object in the data storage facility,
a derivation mechanism for deriving a signature from the object name in the user request, and
a second procedure operated by the RQR for responding to a user request, the second procedure for searching the unique signature listed in the metadata table to derive therefrom the related physical location of the requested object and gaining direct access thereto.

39. The system according to claim 36, wherein operation of the metadata table comprises:
a sequence for starting the ORA on power-on, for initializing building of the metadata table by help of the update engine, for updating the metadata table in repeated update cycles, and for ending operation, on intentional or unintentional shut-down of the ORA.

40. The system according to claim 39, further comprising:
an initial scanning for scanning the contents of the data storage facility to retrieve therefrom metadata indicative of objects residing therein, the metadata being used for building of the metadata table, and
an update scanning for scanning the contents of the data storage facility to detect therein and to retrieve therefrom metadata indicative of change in the contents of the data storage facility, the update scanning being repeated for updating the metadata table repetitively at intervals.

41. The system according to claim 40, wherein the initial scanning further comprises:
accepting user requests during initial scanning,
accessing the metadata table concurrently with the initial scanning, and
a hit/miss mechanism for detecting presence of the at least one condition, the hit/miss mechanism scoring increased success hits correlative with progress of the initial scanning.

42. The system according to claim 33, wherein returning to the user(s) responses to requests further comprises:
a dynamic threshold determining a limit to memory resources allocated to store responses received from the server and from the direct access communication link, responses being stored for sequential return thereof to the users, the dynamic threshold limit being determined in correspondence with total memory resources available, with the number of active connections and with the throughput capabilities thereof, wherein the user requests are accepted when the limit is respected, and wherein acceptance of user requests is suspended when the limit is exceeded, acceptance being resumed upon return of the threshold to below the limit.

43. The system according to claim 38, wherein
a predetermined group of data objects is defined as a selected group, and
the metadata table is built and updated in association restricted to metadata of the selected group, for further increase of response speed of the ORA.

44. The system according to claim 38, wherein
a non-volatile memory is used to store therein contents of the metadata table saved at the end of each update scanning.

45. The system according to claim 44, wherein
the metadata table is built by retrieving from the non-volatile memory contents of the metadata table last saved therein, and
the metadata table is updated by running the update scanning to detect and to retrieve metadata indicative of change in the contents of the data storage facility, and saving retrieved metadata in the metadata table.

46. The acceleration method according to claim 40, wherein
the update scanning is repeated at intervals of predetermined duration.

47. The system according to claim 46, wherein
a first sensor is configured to sense a load of user requests, and
the update scanning is repeated at intervals correlated to the load sensed.

48. The system according to claim 47, wherein
a second sensor is configured to sense a load of user requests on the RQR, and
the update scanning is repeated at interval duration defined in operative association with the load sensed on the RQR.

49. The system according to claim 47, wherein:
a first background computer program is run on the server for sensing a load of user requests thereon, and the ORA is notified through the SCS of the load of user requests sensed on the server, and
the update scanning is repeated at interval duration defined in operative association with the server.

50. The system according to claim 47, further comprising:
a second background computer program running on the server to detect a server-initiated change to objects residing in the data storage facility, and when change is detected, sending a signal to the ORA through the SCS, and the update scanning is repeated in operative association with the signal from the second background computer program.

51. The acceleration system according to claim 26, wherein the ORA comprises at least:
a processor, a memory, a plurality of communication adapters for internet and data storage facility access, and
a real time operating system and software application computer programs for execution of the operation of the ORA.

* * * * *